(12) United States Patent
Kim et al.

(10) Patent No.: US 9,565,690 B2
(45) Date of Patent: Feb. 7, 2017

(54) MEDIUM ACCESS CONTROL METHOD ENHANCEMENT

(75) Inventors: Taejoon Kim, Berkeley, CA (US);
Sayantan Choudhury, Berkeley, CA (US); Zhong-Yi Jin, Albany, CA (US); Klaus F. Doppler, Albany, CA (US); Chittabrata Ghosh, Union City, CA (US); Hongkun Li, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/307,134

(22) Filed: Nov. 30, 2011

(65) Prior Publication Data
US 2013/0136066 A1 May 30, 2013

(51) Int. Cl.
*H04W 72/10* (2009.01)
*H04W 72/04* (2009.01)

(52) U.S. Cl.
CPC ......... *H04W 72/10* (2013.01); *H04W 72/0406* (2013.01)

(58) Field of Classification Search
CPC ..................... H04L 29/127235; H04L 61/3075
USPC ............... 370/235, 252, 329, 338, 444, 449; 455/41.2, 63.1, 69; 709/224, 226, 229
See application file for complete search history.

(56) References Cited

U.S. PATENT DOCUMENTS

| | | | |
|---|---|---|---|
| 6,192,248 B1* | 2/2001 | Solondz | H04W 28/18 455/450 |
| 7,917,641 B2* | 3/2011 | Crampton | H04L 12/5895 709/229 |
| 2002/0163928 A1* | 11/2002 | Rudnick | H04L 47/10 370/444 |
| 2002/0174227 A1* | 11/2002 | Hartsell | H04L 12/5695 709/226 |

(Continued)

FOREIGN PATENT DOCUMENTS

| | | |
|---|---|---|
| EP | 1 975 866 A1 | 10/2008 |
| KR | 20090089964 A | 8/2009 |
| WO | WO 02/39760 A2 | 5/2002 |

OTHER PUBLICATIONS

Malik, Nazir A. et al., "Estimating User preferences by Managing Contextual History in Context Aware Systems", Journal of Software, vol. 4, No. 6, Aug. 2009, pp. 571-576.

(Continued)

*Primary Examiner* — Andrew Lai
*Assistant Examiner* — Chuong M Nguyen
(74) *Attorney, Agent, or Firm* — Harrington & Smith

(57) ABSTRACT

The exemplary embodiments provide at least a method of receiving, by a node of a wireless communication network, more than one indication of data required to be sent from devices in the network, determining that provisioning resources to send the data in response to each of the more than one indication exceeds at least one threshold, and based on the determining, sending a probe message including a (Continued)

priority constraint to the devices. Further, receiving, at a device of a wireless communication network, a probe message from a network node of the network, the probe message identifying a priority constraint, sending, by the device, an acknowledgement to the probe message, the acknowledgment indicating that the device has data to send which meets or exceeds the priority constraint identified in the probe message, and in response to the acknowledgment, receiving from the network node a resource allocation to send the data.

21 Claims, 12 Drawing Sheets

(56) References Cited

U.S. PATENT DOCUMENTS

| | | | |
|---|---|---|---|
| 2003/0046396 A1* | 3/2003 | Richter | G06F 9/505 709/226 |
| 2005/0002372 A1 | 1/2005 | Rune et al. | |
| 2006/0013184 A1 | 1/2006 | Utsunomiya et al. | |
| 2006/0203837 A1 | 9/2006 | Shvodian | |
| 2007/0135162 A1 | 6/2007 | Banerjea et al. | |
| 2007/0153749 A1 | 7/2007 | Waxman | |
| 2008/0075145 A1 | 3/2008 | Balachandran et al. | 375/132 |
| 2008/0080381 A1 | 4/2008 | Maheshwari et al. | 370/235 |
| 2008/0130603 A1 | 6/2008 | Wentink et al. | |
| 2008/0170497 A1 | 7/2008 | Jeong et al. | |
| 2009/0088083 A1* | 4/2009 | Fujii | H04W 52/242 455/69 |
| 2009/0323608 A1 | 12/2009 | Adachi et al. | |
| 2010/0076857 A1 | 3/2010 | Deo et al. | 705/26.1 |
| 2010/0118767 A1 | 5/2010 | Agarwal | 370/316 |
| 2010/0195614 A1 | 8/2010 | Nimbalker et al. | |
| 2010/0216478 A1 | 8/2010 | Buddhikot | |
| 2010/0238854 A1 | 9/2010 | Kazmi et al. | 370/315 |
| 2010/0266057 A1 | 10/2010 | Shrivastava et al. | |
| 2010/0284380 A1* | 11/2010 | Banerjee | H04W 16/14 370/338 |
| 2010/0317389 A1 | 12/2010 | Kim et al. | |
| 2011/0002227 A1 | 1/2011 | Sampath et al. | |
| 2011/0039554 A1 | 2/2011 | Bims | |
| 2011/0158104 A1 | 6/2011 | Frenger et al. | |
| 2011/0194506 A1 | 8/2011 | Hirsch et al. | |
| 2011/0199996 A1 | 8/2011 | Zhang et al. | |
| 2011/0255425 A1 | 10/2011 | Pikkarainen et al. | 370/252 |
| 2011/0255502 A1 | 10/2011 | Shen et al. | 370/329 |
| 2011/0255520 A1 | 10/2011 | Chu et al. | |
| 2011/0274070 A1 | 11/2011 | Xia et al. | |
| 2011/0310869 A1 | 12/2011 | Xhafa et al. | |
| 2012/0051298 A1 | 3/2012 | Kim et al. | 370/329 |
| 2012/0058790 A1 | 3/2012 | Junell et al. | |
| 2012/0128090 A1 | 5/2012 | Seok | |
| 2012/0275305 A1* | 11/2012 | Lin | H04W 74/0841 370/235 |
| 2012/0302272 A1 | 11/2012 | Hakola et al. | 455/509 |
| 2013/0039387 A1 | 2/2013 | Qu | |
| 2013/0051256 A1* | 2/2013 | Ong | H04W 74/0816 370/252 |

OTHER PUBLICATIONS

Saha, Dola, et al., "PHY Aided MAC—A New Paradigm", IEEE 2009, 5 pgs.

Cottatellucci, Laura, et al., "Asynchronous CDMA Systems With Random Spreading—Part I: Fundamental Limits", IEEE Transactions on Information Theory, vol. 56, No. 4, Apr. 2010, pp. 1477-1497.

Popovic, Branislav M., "Spreading Sequences for Multicarrier CDMA Systems", IEEE Transactions on Communications, vol. 47, No. 6, Jun. 1999, pp. 918-926.

Zhong-Yi Jin et al., "Improving the Speed and Scalability of Distributed Simulations of Sensor Networks", IPSN 2009, pp. 169-180.

"Potential Compromise for 802.11ah Use case Document", IEEE 802.11-11/0457r0, Mar. 2011, 27 pgs.

"TGah Functional Requirements and Evaluation Methodology Rev. 4", IEEE P802.11-09/00000905r4, Sep. 2011, 25 pgs.

* cited by examiner

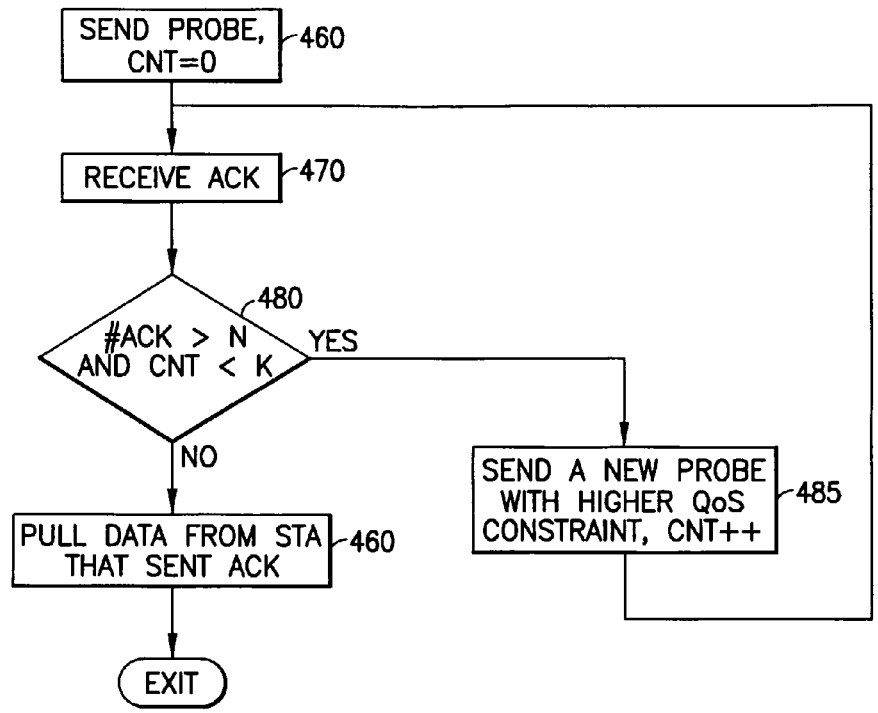

| SEQUENCE ID | TIME OFFSET |
|---|---|
| A | 4 |
| B | 6 |
| ... | ... |

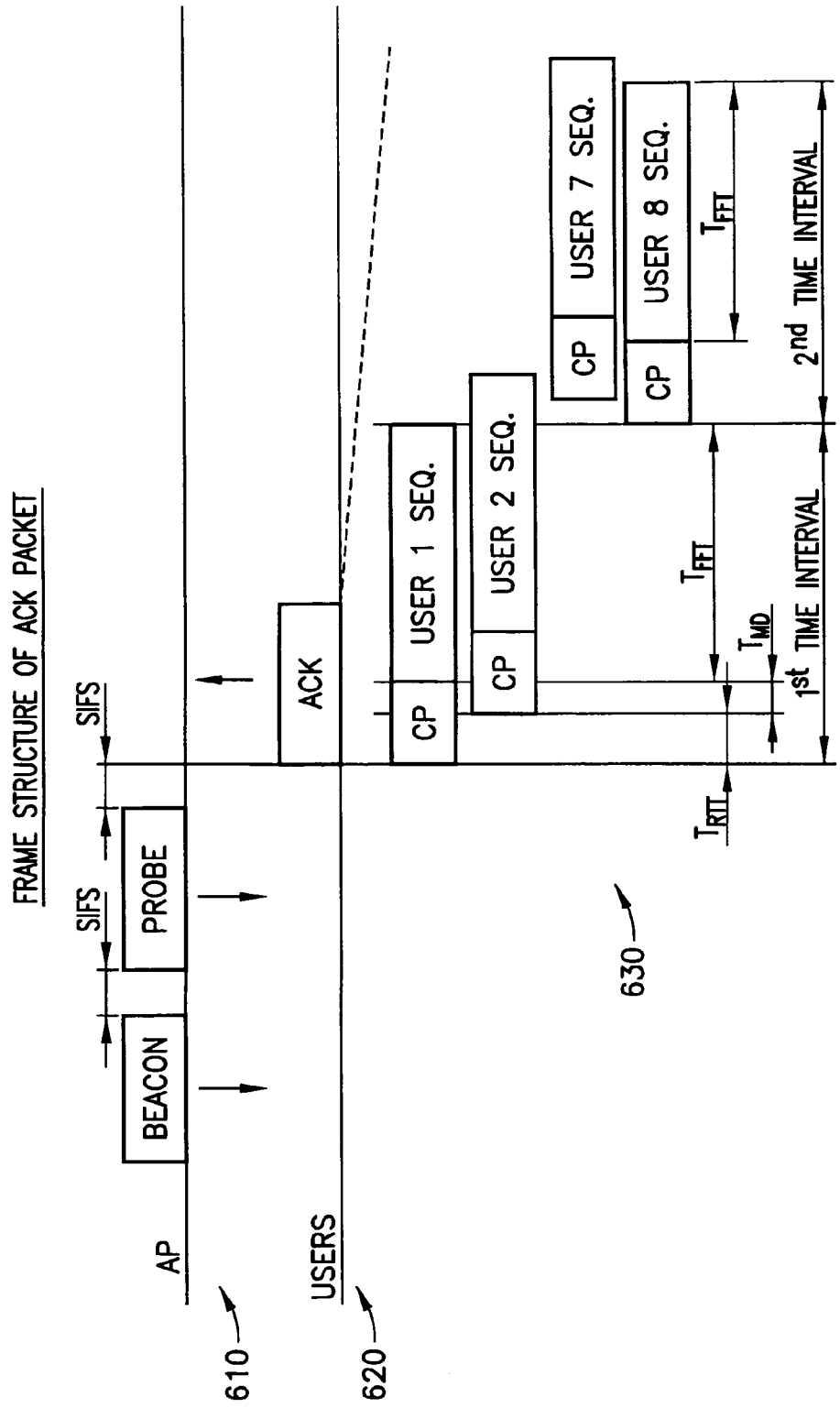

| USERS (710) | SEQUENCE ID (720) | TIME OFFSET (730) |
|---|---|---|
| 1 | 1 | 1 |
| 2 | 2 | 1 |
| 3 | 3 | 1 |
| 4 | 4 | 1 |
| 5 | 1 | 2 |
| 6 | 2 | 2 |
| 7 | 3 | 2 |
| 8 | 4 | 2 |

FIG.7A

| SEQUENCE ID (740) | CYCLIC SHIFT DIMENSIONING (750) | | | |
|---|---|---|---|---|
| 1 | A | B | C | D |
| 2 | B | C | D | A |
| 3 | C | D | A | B |
| 4 | D | A | B | C |

FIG.7B

MEDIUM ACCESS CONTROL METHOD ENHANCEMENT

TECHNICAL FIELD

The exemplary embodiments of this invention relate generally to a method to improve resource allocation for communications in a network, such as a wireless network, and more specifically relate to a method and apparatus to identify and utilize device characteristics to improve resource allocation to devices in the network.

BACKGROUND

In certain circumstances there can be a need to optimize network resource allocation requests. For example, in situations where multiple devices in a network are able to, almost, simultaneously request network resources in order to transmit and/or receive data, a network device responsible for provisioning allocations may not have enough resources available to handle all the requests, at least in an acceptable manner.

SUMMARY

In an exemplary aspect of the invention, there is a method comprising receiving, by a network node of a wireless communication network, more than one indication of data required to be sent from devices in the wireless communication network, determining that provisioning resources to send the data in response to each of the more than one indication exceeds at least one threshold, and based on the determining, sending a probe message comprising a priority constraint to the devices.

In an exemplary aspect of the invention, there is an apparatus comprising at least one processor, and at least one memory including computer program code, where the at least one memory and the computer program code are configured, with the at least one processor, to cause the apparatus to at least: receive, with a network node of a wireless communication network, more than one indication of data required to be sent from devices in the wireless communication network, determine that provisioning resources to send the data in response to each of the more than one indication exceeds at least one threshold, and send, based on the determining, a probe message comprising a priority constraint to the devices.

In an exemplary aspect of the invention, there is an apparatus comprising means for receiving, at a network node of a wireless communication network, more than one indication of data required to be sent from devices in the wireless communication network, means for determining that provisioning resources to send the data in response to each of the more than one indication exceeds at least one threshold, and means, based on the determining, for sending a probe message comprising a priority constraint to the devices.

The exemplary aspect of the invention as stated above, wherein the means for receiving and the means for sending comprises an interface to the wireless communication network, and the means for determining comprises at least one computer readable memory including at least one computer program, the at least one computer program executable by at least one processor.

In another exemplary aspect of the invention, there is a method comprising receiving, at a device of a wireless communication network, a probe message from a network node of the wire communication network, the probe message identifying a priority constraint, sending, by the device, an acknowledgement to the probe message, the acknowledgment indicating that the device has data to send which meets or exceeds the priority constraint identified in the probe message, and in response to the acknowledgment, receiving from the network node a resource allocation to send the data.

In still another exemplary aspect of the invention, there is an apparatus comprising at least one processor, and at least one memory including computer program code, where the at least one memory and the computer program code are configured, with the at least one processor, to cause the apparatus to at least: receive, at a device of a wireless communication network, a probe message from a network node of the wireless communication network, the probe message identifying a priority constraint, send, by the device, an acknowledgement to the probe message, the acknowledgment indicating that the device has data to send which meets or exceeds the priority constraint identified in the probe message, and receive from the network node, in response to the acknowledgment, a resource allocation to send the data.

In yet another exemplary aspect of the invention, there is an apparatus comprising means for receiving, at a device of a wireless communication network, a probe message from a network node of the wireless communication network, the probe message identifying a priority constraint, means for sending, by the device, an acknowledgement to the probe message, the acknowledgment indicating that the device has data to send which meets or exceeds the priority constraint identified in the probe message, and means, in response to the acknowledgment, for receiving from the network node a resource allocation to send the data.

The exemplary aspect of the invention as stated above, wherein the means for receiving comprises an interface to the wireless communication network, and the means for sending the acknowledgment comprises the interface and at least one computer readable memory including at least one computer program, the at least one computer program executable by at least one processor.

BRIEF DESCRIPTION OF THE DRAWINGS

FIG. 4B is a flow chart illustrating an operation including a probe with QoS constraint;

FIG. 4C is a message format of a probe in accordance with an exemplary embodiment of the invention;

FIG. 6 illustrates a sequence ID and time offset table for sequences sent in accordance with the exemplary embodiments of the invention;

FIG. 7 illustrates a frame structure of an ACK packet in accordance with the exemplary embodiments of the invention;

FIGS. 7A and 7B illustrate a table showing predefined sequence identifications (Ids) and time offsets in accordance with the exemplary embodiments of the invention;

DETAILED DESCRIPTION

Figure 1:
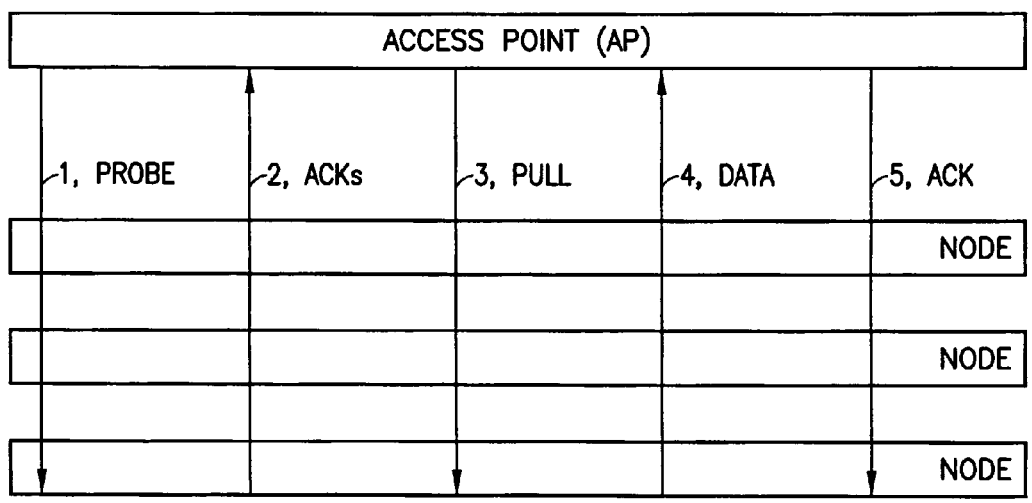
FIG. 1 illustrates the probe and pull medium access control operation.

The exemplary embodiments of the invention provide a method which quality of service (QoS) and priority information can be provided in a novel MAC layer implementation for use in the network. IEEE 802.11 standards are defined for implementing wireless local area network (WLAN) communications. The 802.11 standards were and will be created by the IEEE LAN/MAN Standards Committee (IEEE 802). IEEE 802.11 identifies a series of over-the-air modulation techniques that use a similar basic protocol. Wi-Fi is a brand name for products using the IEEE 802.11 family of standards Certain abbreviations that may be found in the description and/or in the Figures are herewith defined as follows:
ACK acknowledgement
AP access point
AUC authentication center
CAP contention access period
CFP contention free period
CP cyclic prefix
CRC cyclic redundancy check
DFT discrete Fourier transform
DL downlink
FFT fast fourier transform
GI guard interval
HPLMN home public lan mobile network
MAC medium access control
MCC mobile country code
MCN mobile network code
ML maximum likelihood
MNO mobile network operator
MU macro urban
OFDM orthogonal frequency domain multiplex
PCF point coordination function
PLMN public lan mobile network
PP-MAC probe and pull medium access control
PSMP power save multi-poll
PHY ACK physical layer acknowledgement
QoS quality of service
RIFS reduced interframe space
SCM spatial channel module
SIFS short inter-frame space
SNR signal to noise ratio
SPI stateful packet inspection
STA station
TSPEC traffic specification
UL uplink VLR visitor location register
VNO visitor network operator
WLAN wireless local area network The MAC layer is a sub layer of the data link layer as specified in the seven-layer OSI model (layer 2) and the four-layer TCP/IP model (layer 1). The data link layer provides addressing and channel access control mechanisms that make it possible for multiple terminals or network nodes to communicate within a multiple access network that incorporates a shared medium, such as wireless local area networks (WLAN).

An access point (AP) is a device that allows wireless devices to connect to a wired network using Wi-Fi or 802.11 standards. The AP usually connects to a router (via a wired network), and can relay data between the wireless devices (such as computers or printers) and wired devices of the network.

The 802.11 standard specifies a common medium access control (MAC) Layer, which provides a variety of functions that support the operation of 802.11-based WLANs. In general, the MAC Layer manages and maintains communications between 802.11 stations, mobile electronic devices and/or access points by coordinating the access with a shared radio channel and utilizing protocols that allow communications over the WLAN.

A point coordination function (PCF) is a medium access control layer scheme implemented in 802.11 transmissions where the access point (AP) sends CF-Poll messages to one user device at a time. One problem exists in the PCF implementation under 802.11 in that in response to a CF-Poll message from the access point, each user terminal may transmit its data after receiving the CF-Poll message/packet. In the event there is no data to be transmitted, the user terminal responds with a null frame (or no transmission). Hence, there is loss of channel utilization in the event a node is probed and has no data to transmit, thus making the protocol less efficient. In addition, data reported may only need to be reported infrequently to the AP. Thus, at least the null frame reporting methods, as implemented in the 802.11 WLAN as stated above, can be wasteful of energy.

The exemplary embodiments of the invention provide at least a method and apparatus to reduce energy usage with MAC layer enhancements in a Wi-Fi network. More particularly, the exemplary embodiments of the invention provide a more comprehensive MAC layer mechanism for improved uplink and downlink resource allocation in a Wi-Fi network in order to at least provide improved energy efficient operations of devices using Wi-Fi communication in the network.

The exemplary embodiments of the invention provide signal design methods to enhance Media Access Control (MAC) operations in an 802.11 network. The exemplary embodiments provide a novel method to at least enable more energy efficient operations of these devices. Further, the method in accordance with the exemplary embodiments can be used to at least enhance energy efficiency in infrastructure and ad-hoc wireless networks which may consist of large numbers of devices, such as a large number of user devices and/or access points. Further, the exemplary embodiments provide a method which may support at least one of radio level duty cycling, lower levels of latency within defined boundaries, increase throughput, increase bandwidth utilization, improve quality of service (QOS) and lessen path loss experienced by devices in the network.

Power consumption is an important issue for some of the nodes in a network, such as a WiFi network. The nodes may, for example, rely on limited battery power. Further, nodes may be far away from each other requiring a high transmission power to send messages. The limited battery power may make it desirable for at least some nodes of the network to utilize limited duty cycles for their wireless or radio interfaces, putting the wireless interfaces to sleep most of the time. Sensor nodes may have duty cycles of less than one percent (<1%), less than five percent (<5%), less than two percent (<2%), or one-tenth of a percent (<0.1%), as non-limiting examples.

Sensor or smart meter applications have only infrequent reporting of data to the AP. For example smart meter applications typically have a reporting interval of 4 hours. On average, sensor nodes have a clock drift of 30 to 100 ppm resulting in a clock drift of +/−1.4 s during a 4 hour interval. For example, a conventional platform has a drift of up to 40 microseconds per second using a 7.37 MHz clock resulting in a clock drift of 0.6 s during a 4 hour interval.

In order to save energy, the sensor node should be able to wake up and immediately send its data to the AP. However, due to the large amount of STA and the large coverage area in 802.11ah packet collisions will occur frequently and many STA will not be able to send their data. Thus, resending of data will be required and this will cause a drain on a battery. Further, a user device needs time to be activated and, thus, more time means more power utilization. For example, a conventional sensor node for example needs about 1.66 ms without counting an SPI acquisition time. Thus, in order to get the opportunity to send even one packet, a sensor node may need to be active for about 300 ms, which will also drain the battery.

The exemplary embodiments of the invention provide a method using a probe and pull medium access control (PP-MAC) scheme to intersperse and schedule duration of downlink and uplink transmissions for a network device, such as a user device in a WiFi network, as well as prioritize contention periods for user devices based on a quality of service required. The Contention period can be a period of time after an uplink and/or downlink resource allocation in a Wi-Fi network which would allow a device, such as an STA and/or sensor, sufficient time to complete a receiving and/or transmitting of data. As an example, a contention period can be schedule as second period for frequency hopping (FH) configured devices and second period for direct sequence (DS) configured devices.

In an example embodiment, the sensor nodes and/or devices may keep their wireless interfaces in a sleeping, inactive, or low-power state until they have data to send. While the sleeping, inactive, or low-power state may refer to the state of the wireless or radio interfaces, the sleeping, inactive, or low-power state may also refer to a state of other circuitry or modules within the nodes, such as baseband processors which may process, modulate, and/or demodulate data for transmitting and/or receiving by a wireless or radio interface. The devices, which may include sensor nodes, may, for example, monitor events while maintaining their wireless or radio interfaces in the inactive state. When a sensor node has data to send, the sensor node may transition its wireless interface (or other module) to an active state. In the active state, the sensor nodes/APs may listen for PROBE messages from the access point, which may initiate the sending of the recorded data from the sensor nodes to the access point.

The access point may also have a limited duty cycle, or may continually maintain its wireless interface in an active state. The access point may send PROBE messages to the sensor nodes periodically, and/or non-periodically and/or based on prompts from outside a network, such as outside a wireless network. The PROBE message may identify a group of sensor nodes, or may be broadcast. The sending of the PROBE message that identifies the group of sensor nodes may allow the access point to probe the sensor nodes in the group in parallel to determine which sensor nodes have data to transmit, how much data each sensor node needs to transmit, and the quality of service required for each sensor node's data transfer.

FIG. 1 illustrates an exemplary probe and pull medium access control (PP-MAC) sequence implementation between more than one device (i.e., sensor nodes) and an access point (AP) of a wireless communication network. The PP-MAC sequence implementation can be used to enable a device, such as an access point, to receive an ACK from each of the multiple devices of a wireless network and to detect which device each ACK came from.

A main challenge for the AP in FIG. 1 is to distinguish from the multiple ACKs which user device(s) want to transmit data at any given time. In order to do this, the AP must distinguish each of the poll responses of the multiple users. In some common deployments, it is possible to have 1000 s of nodes (e.g., sensor applications) wanting to transmit concurrently. Considering the amount of poll responses of such a deployment the difficulty for the AP to distinguish each of the poll responses can be exceedingly difficult. An AP using a conventional MAC implementation would be required to use very long sequences of data and high computational complexity at least in order to distinguish poll responses.

In order to address at least the above described shortfalls, the exemplary embodiments of the invention provide a method to coordinate transmissions of stations (STAs) or user devices in a WiFi network, such as an IEEE 802.11 network. In accordance with the exemplary embodiments of the invention, a comprehensive PP-MAC mechanism can be implanted for downlink and uplink transmissions for the STAs or user devices in a WiFi network. Therefore, the STAs will wake up only at the scheduled durations for their downlink and uplink transmissions and sleep during durations for transmissions of other STAs in the WiFi network. In accordance with the exemplary embodiments the PP-MAC mechanism is energy-aware.

The PP-MAC mechanism in accordance with the exemplary embodiments of this invention is interspersed with scheduled durations for downlink and uplink transmissions as well as contention periods for STAs or user devices based on quality of server (QoS) requirements. The addition of a contentious access for QoS sensitive traffic provides a novel mechanism which is notably an improvement distinguishable from at least the power save multi-poll (PSMP) framework in IEEE 802.11 networks, for example. Further, the exemplary embodiments provide for an enhanced transmission of traffic specification (TSPEC) information by each of the STAs as specified in PSMP framework. It is noted that although the PP-MAC mechanism, in accordance with the exemplary embodiments, may have some similarities to the contention free period (CFP) and a contention access period (CAP) as in IEEE 802.11 networks, at least the probe and pull signal operations and the provisioning operations for scheduled uplink transmissions of remaining STAs from the previous PP-MAC duration are a significant advance over conventional approaches The PP-MAC layer implementation, in accordance with exemplary embodiments of the invention, may enable at least one of:

1. PP-MAC allocation for probed STAs, STAs from a previous PP-MAC duration (termed as PSTAs), and QoS-constrained STAs;
2. Provision of predefined allocation for uplink transmission durations from PSTAs, which were not able to complete transmission of its queued packets;
3. Provision for predefined allocation of downlink transmission for PSTAs;
4. Restrictive distributed control functions (DCF) among STAs such as based on selected QoS constraints to:
   a. restrict a contention to STAs with higher QoS constraints; and
   b. provide a fairness or balanced resource allocation mechanism which allows access to STAs which were not granted access within the uplink phase, such as during a contention phase; and
5. Use of Reduced Interframe Space (RIFS) in the handshake phase as well as in downlink and uplink phases between transmissions to and from STAs.

The exemplary embodiments of the invention provide a method to categorize user devices into different groups with each group having its own group ID and each user device of the group having their own ID. Hence, each user can be identified by a group and/or a user id.

The grouping or user ID allocation can be performed arbitrarily or can be based on different factors such as the device category or a device type, quality of service requirement of each user device, and/or path loss between a user device and an AP when an association takes place. In an exemplary embodiment, all user devices within a group may be located on a particular ring and/or cell boundary and/or belong to the same device, same QoS category, and/or cluster. Grouping user devices placed within as same or similar distance from AP provides a simple way to overcome, for example, near-far problems in a multiple access scenario. Further, in accordance with the exemplary embodiments, the grouping can be based upon information that a user device provides to an AP when the device was initially associated with a network for example. In addition, such information regarding a user device can include a device category and/or a device type, a QoS requirement for the device, and/or other information associated with the device.

Further, in accordance with the exemplary embodiments of the invention, the information can be provided/obtained using a link to a cloud service to obtain the parameters on how the sensor node should operate. Meanwhile, the AP measures channel quality using preambles and pilots presented in the association packet, and estimates path loss between an AP and an STA which also can be used to formulate user device groupings. Information regarding a group ID and/or user ID can be predefined for a user device and/or obtained from the user device when the user device was earlier and/or initially associated with a network for example. Such group ID and/or user ID information can be stored in a memory of a network device and/or stored in a database associated with the network and/or network device, and be accessible by the network device, such as an AP. Further, the group ID and/or user ID information (as well as sequence information) can be distributed to a user device using a PROBE message, as illustrated in FIG. 1. Further, in accordance with the exemplary embodiments of the invention, obtaining the Information regarding a group ID and/or user ID of a user device, as well as providing the sequence information for a user device, can be performed simultaneously using a PROBE message.

In accordance with another exemplary embodiment of the invention, a PP-MAC probe type packet can be implemented in order to enable a device, such as an AP, to probe multiple user devices at a time. Then, based on responses to the PROBE messages, the AP can schedule only those user devices that have data to transmit. To achieve this novel implementation the AP is enabled to resolve ACK responses to the PROBE messages from multiple user devices in order to identify the user device from which a particular ACK was received.

In accordance with an exemplary embodiment of the invention, user devices in a Wi-Fi network are partitioned into groups based on various factors using information regarding each of the user devices. Then the user devices as partitioned are assigned to specific sequences which are used to resolve the user devices within a user group. The grouping or partitioning can be performed based on a user ID or can be performed, for example, arbitrarily or based on different factors such as the device category and/or device type, quality of service requirement of each user, and/or path loss between user and AP when the association takes place.

In accordance with an exemplary embodiment of the invention, all user devices can be grouped according to a location on a ring and/or cell boundary and/or based on their association with a similar device. Further, user devices can be grouped according to a service level agreement with an operator, and/or based on their QoS requirements, and/or based on the device location, such as the location being near or far away with regards to another device. Grouping user devices located a same (or similar) distance from an AP can be an easier way to overcome problems, for example near-far problems associated with a multiple access scenario The grouping can be performed using information that a user device has provided to an AP, such information can include as a device category, and/or a device type and/or device QoS, information. Such information can be obtained from the user device when the user device was earlier and/or initially associated with the network for example. Further, in accordance with the exemplary embodiments, the information can be obtained over a link to a cloud service to get the parameters on how the sensor node should operate. Meanwhile, the AP measures the channel using preambles and pilots presented in the association packet and estimates path loss between the AP and a STA which also can be used for grouping users. The group ID and/or user ID (or sequence information) can also be distributed to the devices, in parallel, using a PROBE message, as in FIG. 1.

In accordance with the exemplary embodiments of the invention, there are novel mechanisms provided which enable a network device, such as an AP, to assign sequences to the different groups and user devices. While the sequences described with respect to the invention may be described as Zadoff Chu sequences, the exemplary embodiments of the invention can be used with other orthogonal codes and/or sequences as well. For the case where Zadoff-Chu sequences are used, each group could be identified by a different root sequence and users within the group uses different cyclic shifts of the root sequence. In this manner, different groups with different device categories and/or device types, QoS, and/or cluster can be distinguished based on the root sequence.

Figure 2:
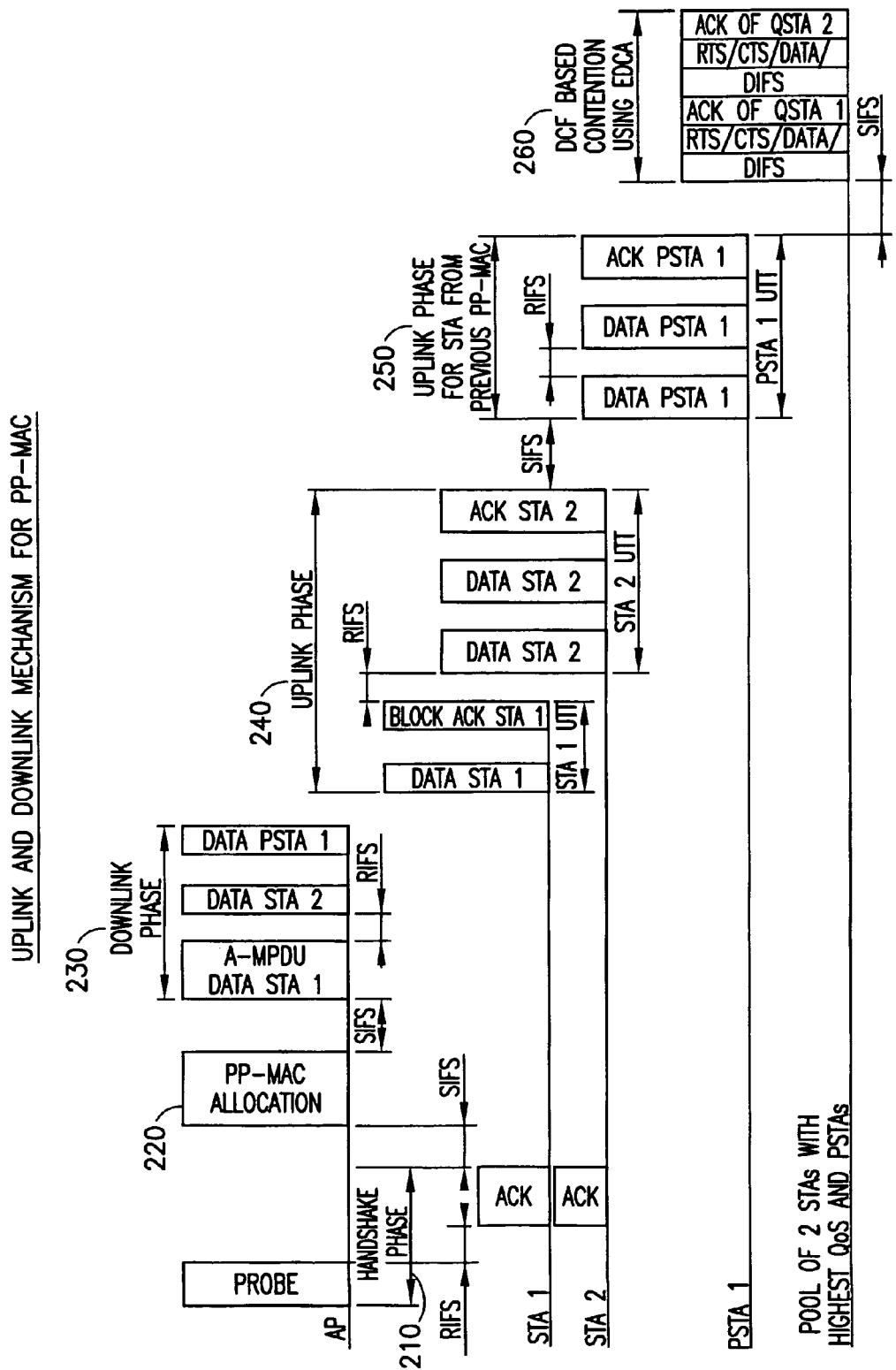
FIG. 2 illustrates an Uplink and Downlink Mechanism for a PP-MAC in accordance with the exemplary embodiments of the invention.

In regards to FIG. 2, there is illustrated Uplink and Downlink Mechanisms for the PP-MAC, as in accordance with the exemplary embodiments of the invention. In non-limiting embodiments of the invention, the PP-MAC enables novel uplink and downlink mechanisms which enable operational phases comprising a handshake phase 210, a PP-MAC allocation 220, a downlink phase 230, an uplink phase 240, an uplink phase for STAs from a previous PP-MAC 250 and a contention phase 260. Each of these operations is described below in more detail.

Figure 10:
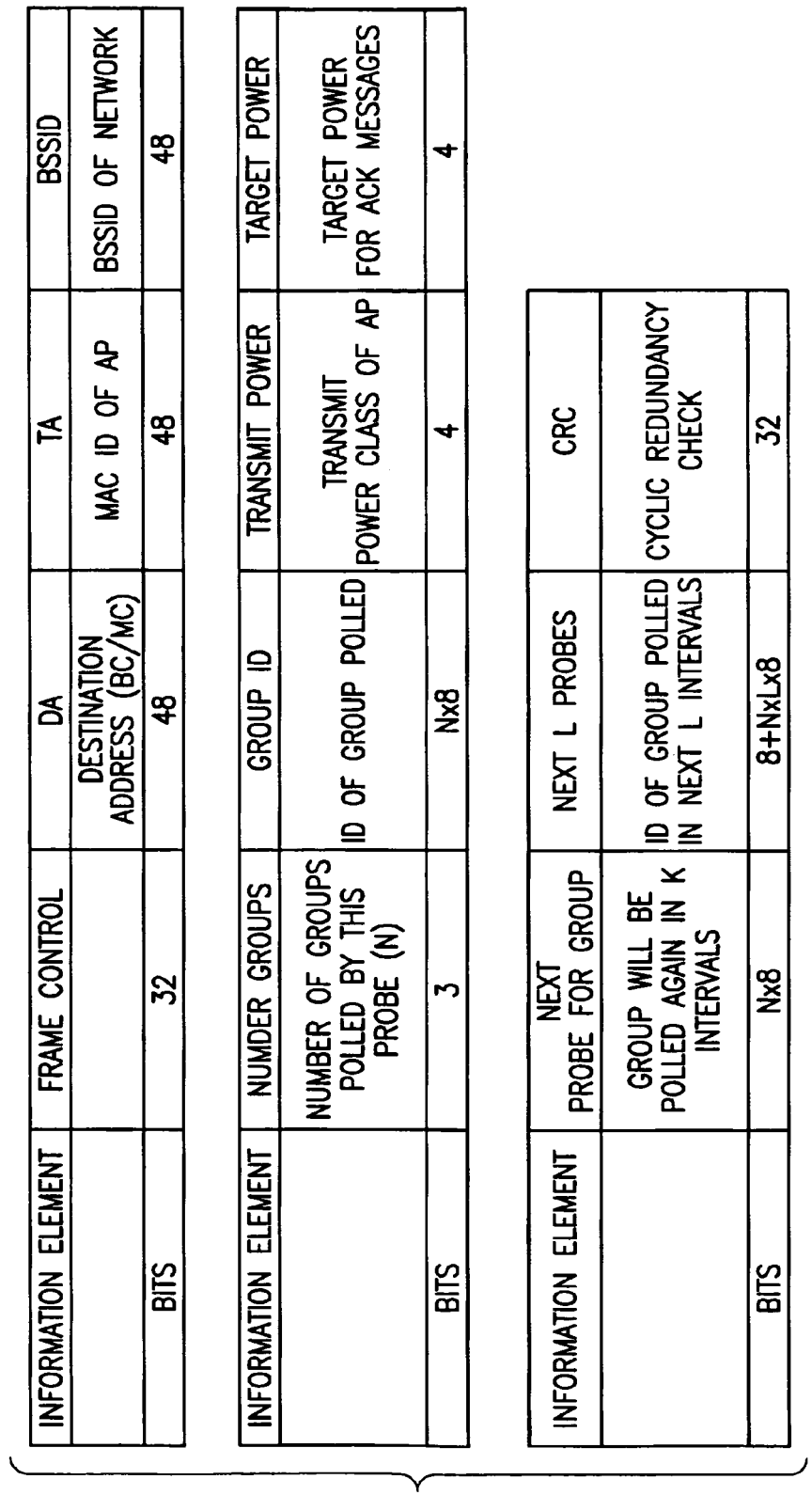
FIG. 10 illustrates a message format of a probe request, in accordance with the exemplary embodiments of the invention.

Handshake Phase 210:

In this phase, in accordance with the exemplary embodiments of the invention, the AP transmits a unicast probe signal to one group consisting of a predefined number of STAs. An idea of this probe signal is to inquire whether STAs in a group have packets to transmit. This probe is performed over all the groups sequentially over the proposed 6000 STAs. An example message format of the probe signal is illustrated in FIG. 10, as described below. Based on the probe signal received, the STAs in this group respond with an ACK. The preamble in the ACK may provide an idea to the AP about the class of traffic including a coarse estimate of amount of data traffic allocation required (high, medium, or low) by the STAs in the probed group. An example frame structure of the ACK is illustrated in FIG. 6 and further described below.

PP-MAC Allocation 220:

Based at least partly on the ACK signal received from the probed group, the AP prepares an allocation schedule for the group. This allocation may include both downlink schedules for the STA of currently probed group as well as for STAs from previous PP-MAC duration, also termed as previous STAs (PSTAs), as in FIG. 2. This is clearly novel when compared to the PSMP framework. In accordance with the exemplary embodiments of the invention there is provided a deterministic periodic PP-MAC duration, with configurable periodicity, which initiates with the probe signal and terminates with the contention period, as discussed below. The durations for uplink transmissions from STAs are estimated by the AP based on the traffic class deduced from the preamble of the pull signal. In addition, the duration can be a fixed allocation or fixed duration if there is no additional information of the traffic allocation requirements at the individual stations, and/or the duration can be determined based on the application and the past traffic of the STA, for example. In another exemplary embodiment, the AP can conservatively start with smaller allocated duration for uplink transmission by each STA. In the next PP-MAC duration, the AP can increase the duration for each STA. It should be noted that the duration for PSTAs can be determined from the last PP-MAC duration. Such as in a last duration where the STA had indicated in a last transmitted packet the remaining buffer size and/or indicated duration required to transmit data in a buffer. It is noted that the downlink and uplink phases can be flexible, such as, based on probed STAs and PSTAs. Further, in accordance with the exemplary embodiments, one or more of the phases, as illustrated in FIG. 2, can be adjusted by the AP to achieve maximum spectrum utilization.

Normally, an STA would enter an idle/sleep stage following a probe if the STA has no data to transmit/receive. However, if a STA has data to transmit/receive or if the STA has data remaining which could not be transmitted during a prior resource allocation then a PSTA will be scheduled and the STA is required to stay in active mode for a following probe, pull or a next probing interval to receive the needed resource allocation. In addition, it is possible that the AP missed the ACK of a STA, such as in a downlink, and/or that the AP is not able to serve the STA, such as in an uplink direction, due to overload situations or that the STA cannot decode its allocation. In any of these cases the AP might not schedule the STA as PSTA. However, it is possible that an STA has missed an ACK and/or that the AP is not able to serve the STA due to overload situations and/or that the STA cannot decode its allocation. In each of these cases the AP might not schedule the STA as PSTA.

In order to limit the number of PP-MAC allocation messages that a station is required to monitor, hence wake-up for, the exemplary embodiments of the invention provide a use of a timer. After a station has transmitted its data during an allocated uplink phase and/or indicated to the AP that it has more data to transmit the station starts a timer. Operations associated with the timer are discussed below with regards to FIG. 3. At an expiry of the timer the STA may drop leftover packets. Further, in accordance with the embodiments, if the STA is scheduled uplink resources before the expiry of the timer, for example during a next PP-MAC duration, the station transmits the data and cancels the timer. However, if the station is not allocated resources in a future or next PP-MAC allocation message and/or if the station could not decode the PP-MAC allocation, the station will continue checking for the PP-MAC allocation messages at least until the station is again probed.

Figure 3:
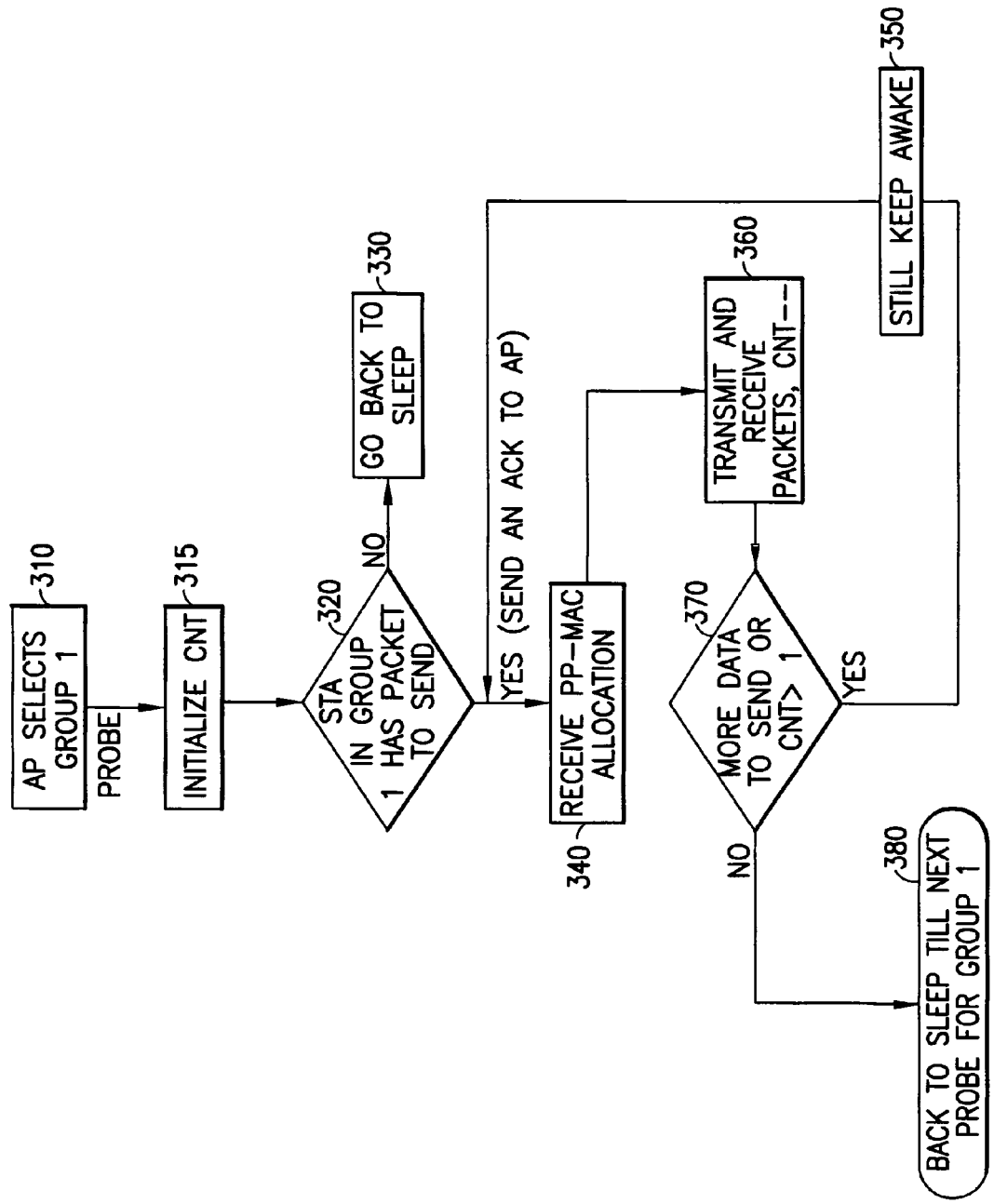
FIG. 3 illustrates a flow chart for PP-MAC STA resource allocation, in accordance with the exemplary embodiments.

FIG. 3 illustrates a flowchart for PP-MAC STA resource allocation. It is noted that, in accordance with the exemplary embodiments, the operations with regards to the PP-MAC allocation 220 as stated above, may or may not be performed with the operations as illustrated in FIG. 3. As illustrated in FIG. 3, at block 310 the AP selects group 1 to probe. At block 315 a timer (cnt) is initialized. At block 320, based on the probe if it is determined that the STA of group 1 does not have data to send then the STA enters or returns to a sleep mode, as in block 330. If, based on the probe it is determined that the STA has data to send then the STA sends an acknowledgement (ACK) of the probe. A frame structure of the ACK, in accordance with the exemplary embodiments, can be seen in FIG. 6 which is described below. Following the ACK, as shown in block 340 a PP-MAC allocation is received by the STA and a timer (cnt) may be started. While the timer is operating, the STA transmits and/or receives its data using the PP-MAC allocation, as shown in block 360. At block 370, if the STA still or again has data to send and/or receive, and/or if the timer (cnt) has a value of time remaining, for example cnt>1, then the STA stays awake or wakes up for the next PP-MAC allocation as shown in block 350. For this case, the STA waits for another PP-MAC allocation to send/receive the remaining data. If at block 370 the STA does not have more data to send then the STA returns to a sleep mode, at least to conserve power.

Downlink Phase 230:

This phase is initiated after the broadcast of the PP-MAC allocation and/or a predetermined SIFS period. Aggregated frames for designated STAs are sent by the AP during the durations specified in the PP-MAC allocation. An ACK, or a block-ACK, will be sent by the receiving STAs to the AP during the uplink phase. The ACK or block-ACK may also be sent immediately after a downlink transmission. It is to be noted that PP-MAC can allocate time slots for STAs, such as identified in a previous PP-MAC, probe period in order to receive packets from the AP.

Uplink Phase 240:

In this phase, the probed STAs transmit their queued packets to the AP along with an ACK for previously received packets, such as packets received from an AP in the previous downlink phase. Each STA can transmit its packets within its allocated transmission duration. In case of packets still queued at the STA, the last packet contains information (e.g., 4 bits) about the additional data information still left to be transmitted. This information is utilized by the AP to schedule additional time duration required for the STAs in the next PP-MAC duration. This computed durations are then broadcasted in the PP-MAC allocation.

Uplink Phase for STAs from Previous PP-MAC 250:

This phase relates to a transmission of data packets of those STAs that did not complete transmitting all their queued packets within the designated uplink duration. The intermittent packets from one STA are transmitted after RIFS durations, for example. The ACK for the downlink transmissions from the AP to one or more PSTAs has to be completed within the specified uplink durations. As an illustration, as in FIG. 2, only one PSTA is allocated time slots for both downlink and uplink transmissions.

Contention Phase 260:

For STAs and PSTA that could not get sufficient allocation in the contention free period or were not part of the probed group and have data to transmit to the AP, also termed as QoS-enhanced stations (QSTAs), we propose to include a contention period whose duration is specified in the PP-MAC allocation. For the contention phase, enhanced distributed contentious access (EDCA) could be used with varying values of contention windows for various QoS classes of traffic and is proposed to be executed within this duration. If the designated STAs are not allocated in the uplink phase, it can sleep for the downlink and uplink phases and wake up only at the initiation of the contention period defined in the PP-MAC allocation. It is also possible that the contention phase is prioritized to stations that could not be allocated sufficiently during the uplink allocation since the exact amount of transmission resources needed may be unknown to the AP from the ACK signal.

It is noted that an actual order of allocation of the phases could be different from what is mentioned above e.g. the uplink phase could be before the downlink phase. Also, if a station has data to transmit, it can indicate its data requirements in the ACK message in response to its downlink data (either a 1 bit indicator indicating it has uplink traffic or more bits to indicate the amount of data allocation required). This might be especially beneficial for STAs that could otherwise not complete transmission within its allocated duration in the uplink phase.

The ACKs from the AP for all the uplink transmissions can be performed after the end of two uplink transmissions or can be performed after each uplink transmission from an STA.

Figure 4A:
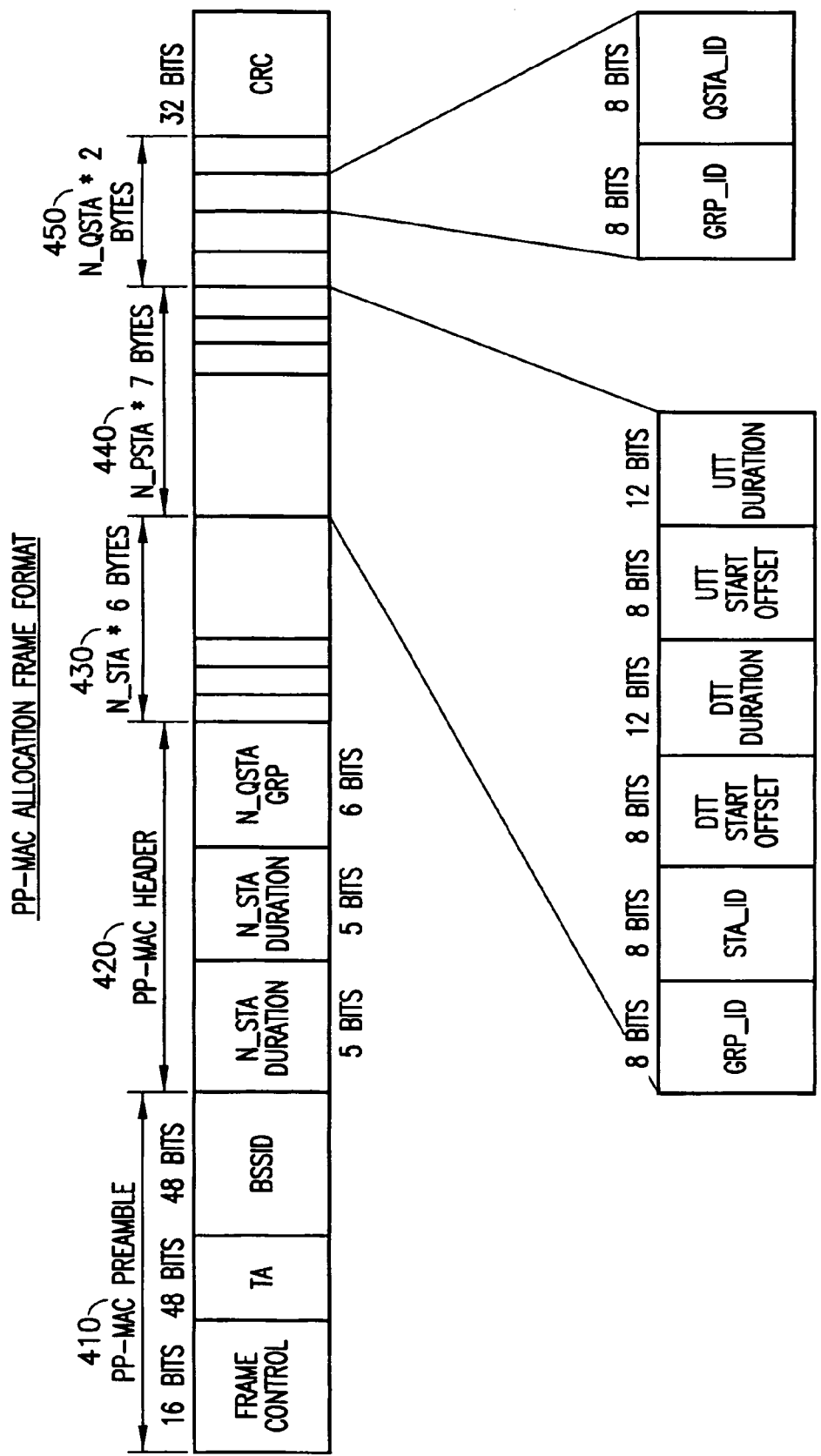
FIG. 4A illustrates a PP-MAC allocation frame format, in accordance with the exemplary embodiments.

An example PP-MAC frame format is shown in FIG. 4A. The PP-MAC Allocation is used to describe the downlink and uplink transmission schedules for STAs, PSTAs, and QSTAs. The PP-MAC frame is to be transmitted by AP only and it is transmitted at the rate of Control Frames. As illustrated in FIG. 4A, the PP-MAC frame includes a PP-MAC preamble 410, PP-MAC header 420, N_STA section 430, N_PSTA section 440 and N_QSTA section 450. These components of the PP-MAC frame are described below in further detail.

PP-MAC Preamble:

The Frame Control (2 bytes) field contains control information used for defining type of 802.11 MAC frame and providing information about processing MAC frame. This field specifies about power management, more data either from STA or the AP, more fragments to be transmitted or not, and whether packets transmitted are retransmissions or new packets. The TA field (6 Bytes) provides the MAC address of the probing AP. The BSSID (6 bytes) specifies the ID of the BSS it would like to serve at that instant.

PP-MAC Header:

The N_STA Duration (5 bits) field indicates the duration of the downlink phase for the probed STAs. The N_PSTA Duration (5 bits) field indicates the duration of the downlink phase for the PSTAs. These two durations can be adjustable based on traffic requests from STAs and pending requests from PSTAs. The duration for the N-QSTAs can be computed based on the fixed PP-MAC duration and the above two durations. The N_QSTA GRP field (6 bits) indicates the number of QSTA groups allocated for the contention period. This number restricts the groups participating in the EDCA based contention. The specification of N_STA Duration and N_PSTA Duration fields assist the QSTAs in computing the exact initiation and duration of the contention phase. Instead of N_STA and N_PSTA duration, for example, an N_STA_DL, N_STA_UL, N_PSTA_DL and N_PSTA_UL may be used. Alternatively, the duration of N_STA and N_PSTA may be signaled as one value as a sum or the duration may be computed implicitly from the following allocations. This field may also be missing and the contention start offset and duration for the QSTA may be signaled separately.

PP-MAC Allocation Schedule:

The STA_ID specifies the ID of the allocated STA. The DTT Start Offset field indicates the start of the PPDU that has the downlink data of the STA with corresponding GRP_ID and STA_ID. Note that GRP_ID is not a required field for the allocated STAs of the currently probed group, since the current PP-MAC duration is for that specific group itself. The offset is specified relative to the end of the PP-MAC frame. The DTT Duration field indicates the end of DL data of a STA relative to the start of the PPDU that contains the first frame destined to the STA. If no DTT is scheduled for a STA, but a UTT is scheduled for that STA, then the DTT Duration is set to 0 and the DTT Start Offset is reserved. Similarly, the UTT Start Offset field indicates the start of the uplink transmissions for the STA with corresponding GRP_ID and STA_ID. The first UTT is scheduled to begin after a SIFS interval from the end of the last scheduled DTT. The UTT Duration field indicates the maximum length of the uplink transmission for an STA. All transmissions by the STA within its designated duration shall lie within the indicated UTT Duration. If no UTT is scheduled for a STA, but a DTT is scheduled for that STA, then the UTT Start Offset and UTT Duration fields are both set to 0. The UTT and DTT durations and start offset fields are similarly defined for all other N_STAs and N_PSTAs. The contention start offset and duration for the QSTAs are defined similarly as above for the STAs. Several possibilities can be applied to reduce the signaling overhead. For example, 2 bits can be added to for each allocation to indicate if the STA is scheduled an UTT or DTT. If a STA is not allocated an UTT or DTT the related fields can be skipped. The offset to start the first DTT allocation can be fixed and hence does not have to be signaled. Instead of signaling the offset and duration, only the duration may be signaled. The STA can calculate the offset for the own allocation by summing up the durations of the previously allocated STA and by adding the appropriate spacings between the transmissions as illustrated in FIG. 2 as well as the required time to acknowledge packets.

In accordance with the exemplary embodiments, the AP can also restrict the time after the probe at which certain ACK sequences can be transmitted by user device(s) using a time domain and/or a code-domain approach. As mentioned earlier, the sequence and time offset allocation could be performed during an association phase or transmitted along with a PROBE message. FIG. 4 illustrates a table showing different time offsets for different sequence IDs. The time offset could also be interpreted as the amount of the cyclic shift to be applied to a root sequence, such as a Zadoff Chu sequence. In accordance with the exemplary embodiments, a user account, a symbol length and an FFT structure of WiFi symbols can be taken into account for a particular sequence design.

In addition, the orthogonality between sequences of two or more user devices could be in the code domain and/or the time domain. In the code-domain only approach, different user devices transmit sequences that are orthogonal to each other. In the time-domain approach, different users transmit sequences at different time intervals. In the time and code-domain, the user devices could be separated both in the time and code domain.

It can be seen that the exemplary embodiments of the invention, as at least as described above, provide a method to perform novel operations including sequence design and grouping which enables a network operator and/or network device to identify particular devices such as STA(s) and/or sensors that have responded to a probe with an ACK. Further, in accordance with the exemplary embodiments, the network device and/or operator is enabled to resolve ACK responses to the PROBE messages from multiple user devices in order to identify the user device from which a particular ACK was received. As similarly stated above, the preamble in the ACK may provide an idea to the network device about the class of traffic including a coarse estimate of amount of data traffic allocation required (high, medium, or low) by the STAs in the probed group. Then, based at least partly on the ACK signal received from the probed group, the network device prepares an allocation schedule for the group.

It is noted however that there still can be envisioned situations where even devices with a higher class of traffic and/or data traffic allocation requirement cannot be timely and/or sufficiently allocated requested resources. The exemplary embodiments of the invention also provide a solution, as will be described in more detail below, to address at least this type of situation.

The 3 GPP standards body has defined Extended Access Barring (EAB) for use by operator(s) of networks, such as access network and/or core networks. EAB is used to control mobile originating access attempts from user equipment (UE), that are configured for EAB, to prevent overload of the network. In congestion situations, the operator can restrict access to some UEs while permitting access to other UEs configured for EAB. The UEs which are configured for EAB are considered to be more tolerant to access restrictions than other UEs. Thus, EAB can be seen to provide priority to particular UE classes. When an operator determines that it is appropriate to apply or invoke EAB the network broadcasts necessary information to provide EAB control of UEs in a specific area. The following requirements apply for EAB:

The UE is configured for EAB by the HPLMN;
EAB shall be applicable to all 3GPP Radio Access Technologies;
EAB shall be applicable regardless of whether a UE configured for EAB is in a Home network or a Visited PLMN; and
EAB information may be broadcast by the network.

However, EAB does not address situations where an excess number of devices, such as devices having similar data traffic allocation requirements, request resource allocations, seemingly all at once, in response to a broadcast probe. For example, consider a deployment where sensors are deployed in numerous buildings in a large area or a locality to monitor a state of each building in the area. In response to an event which affects the area, such as an earthquake for example, many or all of these STA(s) and/or sensors can have data to transmit. However, only certain ones of these buildings may have experienced a level of effect and/or have sufficient damage to require or warrant that their STA(s) and/or sensors have priority over other devices in the area, the other devices possibly having a similar priority/class of traffic. In this case, although EAB may be used to restrict access to certain devices of an area, EAB cannot be used to allow access only to devices of the area with sufficient levels of effect and/or sufficient damage from the event, for example. In addition, EAB does not consider whether STA(s) and/or sensors and/or the groups have a class of traffic and/or a data traffic allocation requirement similar to one another.

Whereas, the embodiments of the invention provide a method where, in addition to considering a class of traffic and/or a data traffic allocation requirement of an STA and/or sensor, a network device such as an AP can impose a current priority constraint, such as a priority constraint based on a QoS requirement, in order to at least further prioritize resource allocations by the network device.

With regards to FIG. 3, as described above, following an ACK from a device such as a STA or sensor, a PP-MAC allocation is received at the device and a timer (cnt) is started at the device. While the timer (cnt) is operating the device transmits its data using the received allocation. It is noted that although the operations as described below in regards to FIG. 4B can be seen to follow the operations as illustrated in FIG. 3, as described above, in accordance with the exemplary embodiments of the invention operations as illustrated in FIG. 4B may be performed independently.

FIG. 4B is a flow chart illustrating an operation including a probe message with a constraint, as in accordance with the exemplary embodiments. As illustrated in block 460 of FIG. 4B, a network device, such as an AP, sends a probe, such as a probe targeted for a group of STAs or devices. If a STA(s) has data to send and/or if STA(s) has data to send which meets and/or exceeds a probe constraint then the STA(s) will respond with an ACK. As illustrated in block 470, the ACK(s) are received by the network device.

With regards to FIG. 4B, one or more embodiments apply one or more of the following definitions. The variable "#ACK" identifies a number of allocation requests received at once and/or during a brief period of time and/or in parallel. The variable "N" refers to a number of STA(s) which the network device is able to allocate resources to based on currently available network resources. The variable "K" is an integer related to a limit of probes to be sent. Further, "K" can refer to a number of constraint classes, such as incorporated in a probe message. STA(s) which have previously provided a resource allocation request to the network device, such as with an ACK, but who are still waiting to receive the requested resource allocation. Further, the variable "R" refers to resources available at a particular point in time, such as following a period of multiple resource requests.

In accordance with the exemplary embodiments, the network device receives a number (#) of ACKs. The network device determines whether the # of ACKS is greater than (>) "N," or the number of resource allocations which the network device is capable of based on a time allotted and/or resources available to the network device. Further, the network device determines a value of "K", determines the resource allocations required to meet the pending resource allocations of the STA(s), and also determines the network resources (R) that are available. Using at least some of these variables, the network device performs operations such as determining, as illustrated in block 480, that the number # of received ACK is greater (>) than N and/or that a count (cnt) of the probes sent is less than (<) "K." It is noted that the novel operation using the value cnt can be used to prevent excessive probe messages from being sent and/or limit the number of probe constraints. Based on at least one these conditions being determined to be true by the network device then, as illustrated in block 485 of FIG. 4B, the AP will then send priority constraint probe(s) This probe message contains further constraints for providing resource allocations. For example, the constraint probe can include a QoS constraint such that only STA(s) and/or sensors with data to send and/or receive having a same and/or higher data traffic allocation QoS requirement, than specified in the constraint probe, responds with an ACK to request a resource allocation for the data.

Although the constraint probe is discussed above with regards to QoS, it is noted that the constraint or further constraint can related to other qualifications including a particular locations of STA(s) and or sensors, traffic conditions, delay tolerance, roaming requirements, access privileges of users, emergency communications, to name only a few. In addition, the constraint probe can be different for different applications of the STA(s) or sensors. For example, different STA(s) and/or sensors may have different applications such as related to infrastructure monitoring, traffic monitoring, environmental monitoring, hospital/health care equipment/environment monitoring, etc. In accordance with the exemplary embodiments, the network device is enabled to send different constraint probes to different STA(s) and/or sensors even if they are part of a same group of devices awaiting resource allocations, and/or even if the STA(s) and/or sensors have similar data traffic allocation requirements. Further, in accordance with the exemplary embodiments of the invention, the probe with the QoS constraint, for example, implements the cnt, such as indicated in block 485 with cnt++.

If further determinations indicate there is still overload situation, the AP may send another probe with higher QoS constraint until the amount of responses is less than N. In order to limit the overhead from probe transmissions, K will typically be a low number, and can have a value of, for example, about 2. If there is not an overload situation, or there is no longer an overload situation, then as illustrated in block 490 a Pull message is sent to the STA(s) that sent the ACK(s).

In accordance with an exemplary embodiment of the invention, the STA will send an ACK if it has data to send and the QoS class of its packets is higher than indicated by the AP. Then it will normally receive an allocation frame. If there is an overload situation, it might receive another probe with another QoS requirement. If the QoS class of its packets is higher than the indicated class it will send an ACK. This can continue until it receives an allocation frame. The allocation then tells if and when it should transmit/receive data.

In accordance with the exemplary embodiments of the invention, a QoS requirement can be different for different applications and/or sensors. In case of infrastructure monitoring sensors the following QoS classes can be defined:
1. Regular reporting
2. Low activity
3. Medium activity
4. Strong activity
5. Malfunction detected If the QoS requirement broadcasted by the AP is higher than 3, then only sensors detecting strong activity or a malfunction will reply with an ACK. In a variation of this method, the AP could pull data from some of the STA and include the QoS constraint only in the next probe.

Further, in addition to the message fields, as at least discussed above with regards to FIG. 4A, a probe can include message fields as illustrated in FIG. 4C. As illustrated in FIG. 4C, a group ID field can specify an ID of a group to be polled. It is noted that 802.11 ah allows up to 6000 STA which can be grouped, for example, in 40 groups of 150 STA each. As illustrated in FIG. 4C, a quality of service (QoS) constraint field can specify a minimum QoS class that is required to send an ACK. If the value is 0, all STA with data to send can send an ACK. If the value is 1, only STA with QoS class of 1 or higher can send an ACK, and so on. Further, in accordance with the exemplary embodiments of the invention as illustrated in FIG. 4C, the group ID field can comprise 8 bits in the probe message, and the QoS constraint field can comprise 4 bits in the probe message.

Figures 5A, 5B:
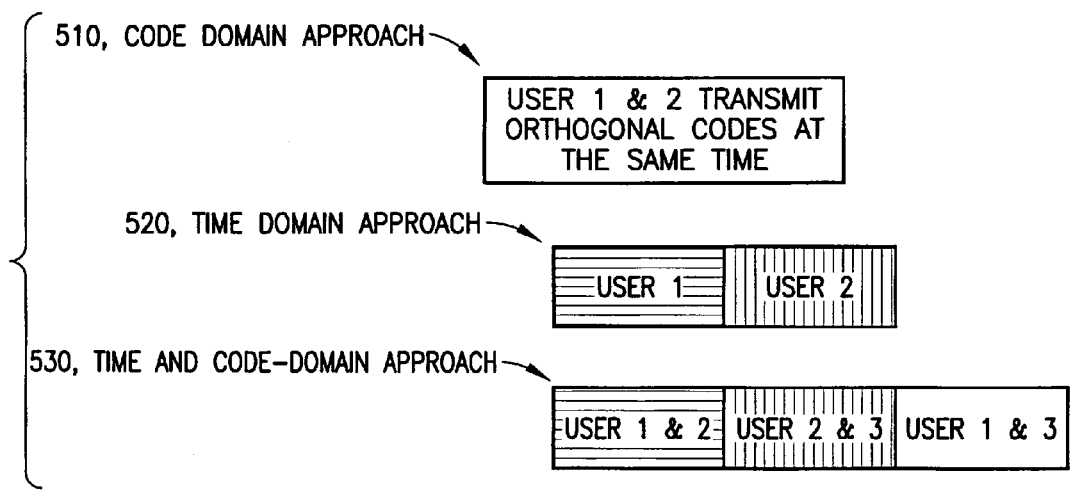
FIG. 5 illustrates a code domain approach, a time domain approach, and a time and code domain approach, in accordance with the exemplary embodiments.

FIG. 5A illustrates transmit sequences of grouped user devices for a code domain approach 510, a time domain approach 520 as well as a time and code domain approach 530, as in accordance with an exemplary embodiment of the invention. In the code domain approach 510, user devices 1 and 2 transmit orthogonal codes at the same time in the same code domain. In the time domain approach 520 user device 1 transmits in a first code domain and user device 2 transmits in a second code domain. Whereas, in the time and code domain approach 530 user device 1 and 2 transmit at the same time in a first code domain, user devices 2 and 3 transmit at the same time in a next code domain, and then user devices 1 and 3 at the same time in another next code domain.

Note that with these three configurations, another domain, such as a frequency domain, can be added. The sequence length is determined by the round-trip delay, coverage requirements, number of user devices to be supported and overhead requirements. In addition, depending on the operating SNR and allowed time duration for ACK signaling, AP and user devices can coordinate to switch between two orthogonal approaches. For example, they can agree to switch between the code-domain approach and the time and code-domain approach.

Further, a set of sequences could also be categorized into different groups based on the amount of traffic allocation required by an user. For example, there could be different sets of sequence groups based on load such as:
Sequence Group 1: "High" traffic
Sequence Group 2: "Medium" traffic
Sequence Group 3: "Low" traffic Hence, based on the poll response (ACK) of any user, the access point not only knows which user device(s) has traffic to send it is also enabled to estimate an amount of traffic allocation that will be required by a user device. The access point in its PROBE message could also restrict user responses based on the amount of traffic it has to send, such as to send the probe to user devices only with "Low" amounts of traffic to send. Such grouping could be done based on using different root sequences for different groups or different cyclic shifts for a given group. Hence, the sequences implicitly carry some information about the traffic load. Further, in accordance with the exemplary embodiments of the invention, the classification of the high, medium and low traffic requirements can be predetermined and/or configured by a user, a network administrator, and/or a manufacturer of a device, such as an AP.

The following description will provide an even more detailed disclosure of the invention. In particular, it will be described how at least the above mechanisms can be implemented for a transmission, such as an OFDM transmission. Conventional WiFi mechanisms cannot distinguish concurrent poll responses from multiple users, as in accordance with the exemplary embodiments.

In this exemplary implementation, it can be assumed a 64 bit FFT size in 2 MHz bandwidth supported by IEEE 802.11ah for example. With this specification, subcarrier spacing is determined by 31.25 KHz resulting in $T_{FFT}$=32 us of FFT-time window. The OFDM symbol and packet structure must be determined based on the maximum round-trip time delay (maximum coverage requirements), maximum multipath spreading, synchronization and channel estimation requirements, and overhead requirements.

FIG. 5 illustrates a frame structure of an ACK packet in accordance with the exemplary embodiments of the invention. As illustrated in FIG. 5, the response to a PROBE message from the AP 510 can be transmitted by the user device 520 in a time-aligned manner as shown in FIG. 5. Each user device 520 transmits concurrently just after the PROBE message is received. The period after the PROBE message may be predefined in the standard and/or set by the AP. As shown in 530 of FIG. 5, in order to avoid inter symbol interference and maintain continuity of the OFDM symbol, the CP length ($T_{CP}$) must be greater than $T_{RTT}$+$T_{MD}$, where $T_{RTT}$ and $T_{MD}$ denote the maximum round-trip time and maximum multipath delay, respectively. After the PROBE message followed by SIFS, the start of FFT window at AP is taken periodically with $T_{RTT}$+$T_{MD}$ separation. As can be seen from FIG. 5, as long as $T_{CP}$ is greater than $T_{RTT}$+$T_{MD}$, multiplexed symbols from different user devices are secured from inter-symbol interference due to multipath delay and maintain continuity within sequences. In this particular application, a guard interval (GI) can be omitted from the sequence structure. For the sensor nodes/AP application in 802.11 ah with distance up to 1 km, $T_{RTT}$=6 us and $T_{MD}$=2 us can be set to result in $T_{CP}$=12 us>6 us+2 us with some margin. Please note that this is a longer CP compared to regular 802.11 ah transmissions (8 us). Notice that the start of FFT window can be placed between $T_{RTT}$+$T_{MD}$ and $T_{CP}$.

PROBE messages can be transmitted after the Wi-Fi beacon and at regular intervals between beacons or at varying time instances, as determined by the AP for example. PROBE message contains the group ID and optional the user IDs in the group and/or for a subgroup of the group to be probed in the current frame. FIG. 5 specifically depicts the time and code-domain approach.

FIG. 7A illustrates a table which identifies offset settings 720 and sequence Ids 730 for user devices 710 of a time and code-domain approach time, as illustrated in FIG. 5A. It can be seen that four users among the eight users 710 who have data to send and have transmitted ACK messages with different time offsets than the remaining other four user devices. It is noted that the eight user devices can form a single group or be a subgroup of the single group. In accordance with the exemplary embodiments, the time offsets and sequences could be pre-defined during the association phase or transmitted during the PROBE message.

For example, in a time and code domain implementation, the sequences are designed as Zadoff-Chu (ZC) sequences with different roots and different cyclic shifts. The ZC sequence is given by $$Z_q(n)e^{\left(-j2\pi q \frac{n(n+1)}{N_{zc}}\right)}, n = 0, \ldots, N_{zc}-1, q = 1, \ldots, N_{zc}-1$$

Where Zq is a ZC sequence, where j is an index and where $N_{zc}$ and q denote the length of sequence and the root of the sequence, respectively.

In order to maintain an optimal cyclic cross-correlation property, $N_{zc}$ must be chosen as a prime number. Since the DFT of a ZC sequence is a weighted cyclically-shifted ZC sequence, the sequence can be generated in the time domain or frequency domain by maintaining the desired ZC property. In this implementation, the sequence is generated in a frequency domain. Given a 64 bit FFT size in 2 MHz bandwidth, 802.11 ah specifies to use 56 subcarriers with nulling the rest of 8 subcarriers (including d.c. subcarrier) to meet the spectrum mask. The largest prime number smaller than 56 is $N_{zc}$=53. Four ZC sequences can be used for time offset 1 and 2, as in FIG. 7A. Four different ZC sequences can be obtained by:

a) Cyclically shifting a single root sequence.
b) Directly generating four sequences with four different roots.

For cyclically shifting the single root sequence, as indicated above, the minimum value of the cyclic shift should be the smallest integer that is greater than the number of samples corresponding to $T_{RTT}$ which equals 12 in our example. With 13 cyclic shifts the length 53 sequence $Z_q(0:52)$ can be denoted as ABCD where A=$Z_q(0:12)$, B=$Z_q(13:25)$, C=$Z_q(26:38)$, and D=$Z_q(39:52)$. Thus, four cyclically shifted sequences can be generated, as illustrated in FIG. 7B.

For directly generating the four sequences, as indicated above, four distinct ZC sequences $Z_{q1}$, $Z_{q2}$, $Z_{q3}$, $Z_{q4}$ qi≠qj for i≠j can be used. In addition, several ZC sequences can also be used by mixing the former and latter sequences. After IFFT of ZC sequences and adding CP, total 20+64 samples which correspond to one time interval, i.e., $T_{CP}$+$T_{FFT}$=44 us, are generated.

The sequences may also be included in the OFDM training structure in 802.11 consisting of 10 short preambles and 2 long preambles 710 as illustrated in FIG. 7A. FIG. 7B illustrates an OFDM training structure, as in 802.11.

The short OFDM training symbol consists of 12 subcarriers while the long consists of 53 symbols including 1 for the DC symbol. In accordance with an exemplary embodiment of the invention, there is a multiuser poll mechanism which can re-use the WLAN preamble structure with the short symbols being used for certain users and the longer for a different user class. For instance, more users could use the shorter symbols while fewer are reserved for the longer preambles or vice-versa.

Figure 8:
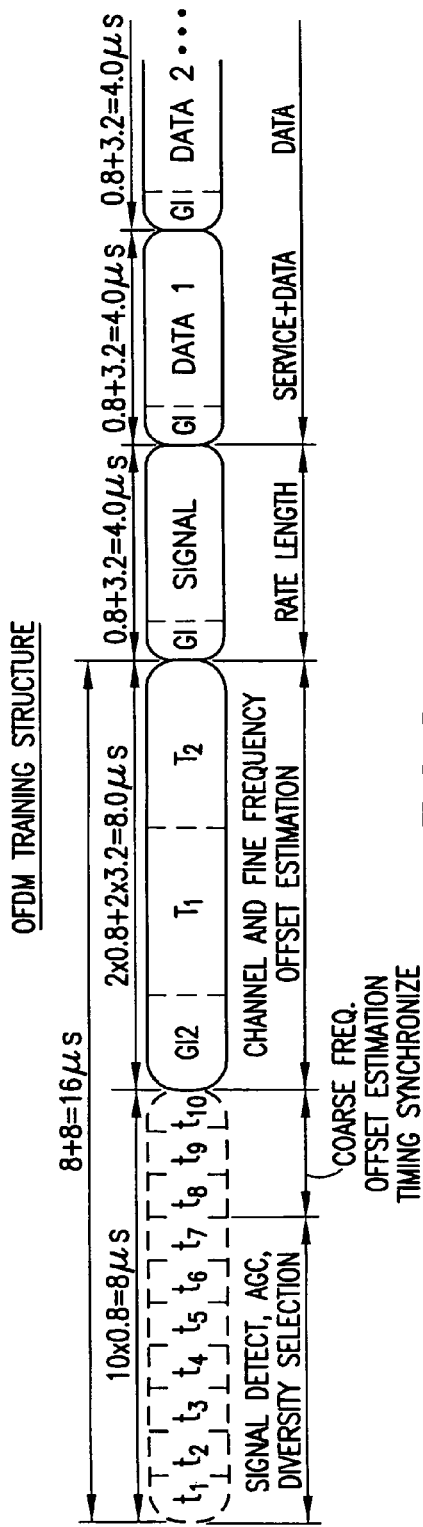
FIG. 8 illustrates an OFDM training structure in 802.11, in accordance with the exemplary embodiments.

It is noted that the symbol duration according to IEEE 802.11 ah is a 10 times down clocked version of the legacy 802.11, such that a $T_{FFT}$=32 us for 2 MHz bandwidth in 802.11ah is down clocked to $T_{FFT}$=3.2 us for 20 MHz bandwidth. Thus, WLAN preamble structure could be easily re-used with simple clock scaling. In the shorter symbols, the sequence of a user could span the entire duration of short training symbols (8 us as in FIG. 8) and different users use different cyclic shifts while choosing their sequences.

Alternatively, different users could be reserved in different short symbols using time and code-domain approach, e.g., user 1 uses short symbol 1,2, user 2 uses short symbol 2,3 etc. In addition, more users can use long-preamble with code-domain approach. The symbols to be used for a particular user could be assigned during association with the access point. For an ACK signal, the rest of the message including the rate length, service and data may not need to be transmitted. In another exemplary embodiment, instead of using short and/or long preambles only short and/or long training symbols can be transmitted. Furthermore, the training symbols may or may not have a cyclic prefix.

Detection of multiplexed user sequences at a given time interval at AP can be done either by performing a correlation at a time domain with a different time offset and/or evaluating an inner product frequency domain, such as after a FFT, with a different phase rotation, i.e., $$q = \underset{q}{\operatorname{argmax}} \max_{m} \left| \sum_{n=1}^{N_{fft}} z_q^*(n) y(n+m) \right|$$

or $$q = \underset{q}{\operatorname{argmax}} \max_{l} \left| \sum_{k=1}^{N_{fft}} Z_q^*(k) Y(k) e^{j2\pi l k / N_{fft}} \right|$$

where $y(n)$ ($Y(k)$) denotes the time (frequency) domain received signal captured during TFFT in FIG. 2 and $z_q(n)$ ($Z_q(k)$) is the time (frequency) domain ZC sequence with root q.

Figure 9:
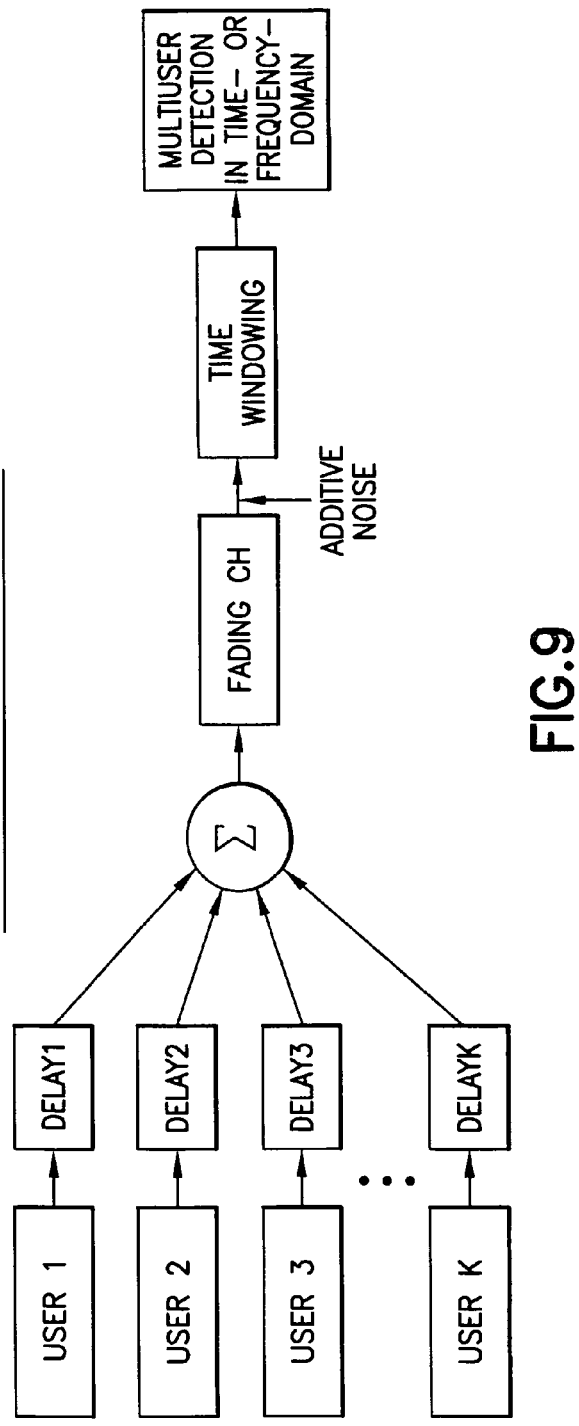
FIG. 9 illustrates a multiuser detection model in accordance with the exemplary embodiments of the invention.

FIG. 9 represents a multiuser detection channel model in our system. Each of delay values in FIG. 9 reflects different ACK arrival times, caused by the different distances between users and AP. In most of the cases, due to the near-far problem AP fails to detect all of the users correctly. To overcome this problem, user typically adapts transmit power so that the received power at AP aligned to the other users' received power. This can be done by specifying the TX power of AP and target received power for the ACK messages at AP in the PROBE message.

In addition, the grouping strategy, in accordance with the exemplary embodiments, can help to reduce the near-far problem by arranging users with similar distance from AP or path loss. Further, the grouping strategy can rely on non-coherent detection since the channel knowledge at AP is unlikely available due to high level of interferences. Fundamentally, ML detection, which compares all possible sequence combinations, is the optimal user detector which can be NP-hard or known in general. Sub-optimally, user detection can be done by comparing to a threshold, (i.e., slicing). If the correlation value between the received signal and $i^{th}$ user sequence is above threshold AP declares user i detected, otherwise, AP declares no user i detected. Depending on an operational SNR, fading channel condition, and/or a number of maximum users to be supported the threshold value can be optimally adapted.

To examine the multiuser detection capability, a Monte Carlo simulation with a SCM Macro Urban (MU) multipath channel fading model is performed. As specified above, 53 length ZC sequences are used. In this simulation, time and code domain approach is designed for 10-10-10-10 structure, i.e., maximum 10 sequences are multiplexed in each of 4 time intervals (i.e., 44 us×4=168 us). In our simulation, one sample time corresponds to 0.5 us and in SCM MU model, RMS delay spread is modeled as 0.65 us. Thus, the multipath channel is generated with two channel taps. Here, threshold-value adaptation is not performed; rather one hard threshold adaptation is performed for all SNRs, where the value is chosen to give reasonable performance at high SNR.

In regards to FIG. 10, there is illustrated a message format of the probe request, in accordance with the exemplary embodiments of the invention. The group ID specifies the ID of the group to be polled. It is noted that 802.11ah requires up to 6000 STA which can be grouped for example in 100 groups of 60 STA. Optional N groups can be polled with one probe. In this case the PROBE message is followed by NACK periods for each group. The order is determined by the order of appearance in the PROBE message. Instead of including N group IDs this information element can be replaced by a bitmap with the size of the number of groups. An entry of one at the position of the group ID indicates that the group will be polled by this PROBE message. The groups may be polled in ascending or descending order of their group ID.

The transmit power of the message format fields, as illustrated in FIG. 10, specifies a transmit power class of the AP. Here, a 4 bit field can distinguish 32 classes. The target power specifies the target received power for the ACK messages relative to the power class of the AP. This enables a simple form of power control which is needed to receive the ACK of all STA within for example 15 to 20 dB relative received power. If the power difference is greater than that, the detection of the ACK from different STA will be unreliable. Without power control the ACK of STA furthest from the AP will not be detected if STA close to the AP send ACK as well.

The next information elements give more information to the STA when it will be polled next. The Next Probe for Group field specifies the interval when the same group will be polled next. This field is present for each polled group. With this information STA that still have data in the buffer after the probe and pull period know when to wake up for the next probe.

The Next L probe field specifies the group IDs polled by the next L PROBE messages. In this case it can be assumed that the same amount of groups will be polled by each of the next L PROBE messages. The first 3 bits specify N and the next 5 bits L. Then follow the group IDs polled by the next L PROBE messages. Instead of signaling each probe separately this information element can be replaced by a bitmap with the size of the number of groups. An entry of one at the position of the group ID indicates that the group will be polled by one of the next L PROBE messages. This information will help a STA that just woke up to determine if it will be probed in the next L PROBE messages. If it is not probed, the STA can go back to idle state for L probe intervals and then wake up to receive the next probe.

In another exemplary embodiment, the AP polls each group in predetermined order. Let's assume the AP PROBE messages the groups in ascending order. If a STA of group 50 wakes up and group 5 is currently polled, it will go back to sleep state for 45 intervals to wake up for the next probe of its group. Further, the PROBE messages may be transmitted frequently such as in durations of milliseconds, for example every 20 ms, and in order to keep the number of bits low. In accordance with the exemplary embodiments of the invention, a PROBE message contains 75 bits when probing a single group and giving information about the group probed in the next 5 PROBE messages. This is very low compared to 176 bits of MAC header and CRC present in each MAC frame.

As can be seen from at least the description above, the exemplary embodiments of the invention can be used to the benefit of any device in a wireless and/or wired and/or combination of wired and wireless communication network. The exemplary embodiments of the invention, such as the PP MAC, provide significant improvements in terms of latency, throughput, bandwidth utilization, power utilization and QOS.

Figure 11:
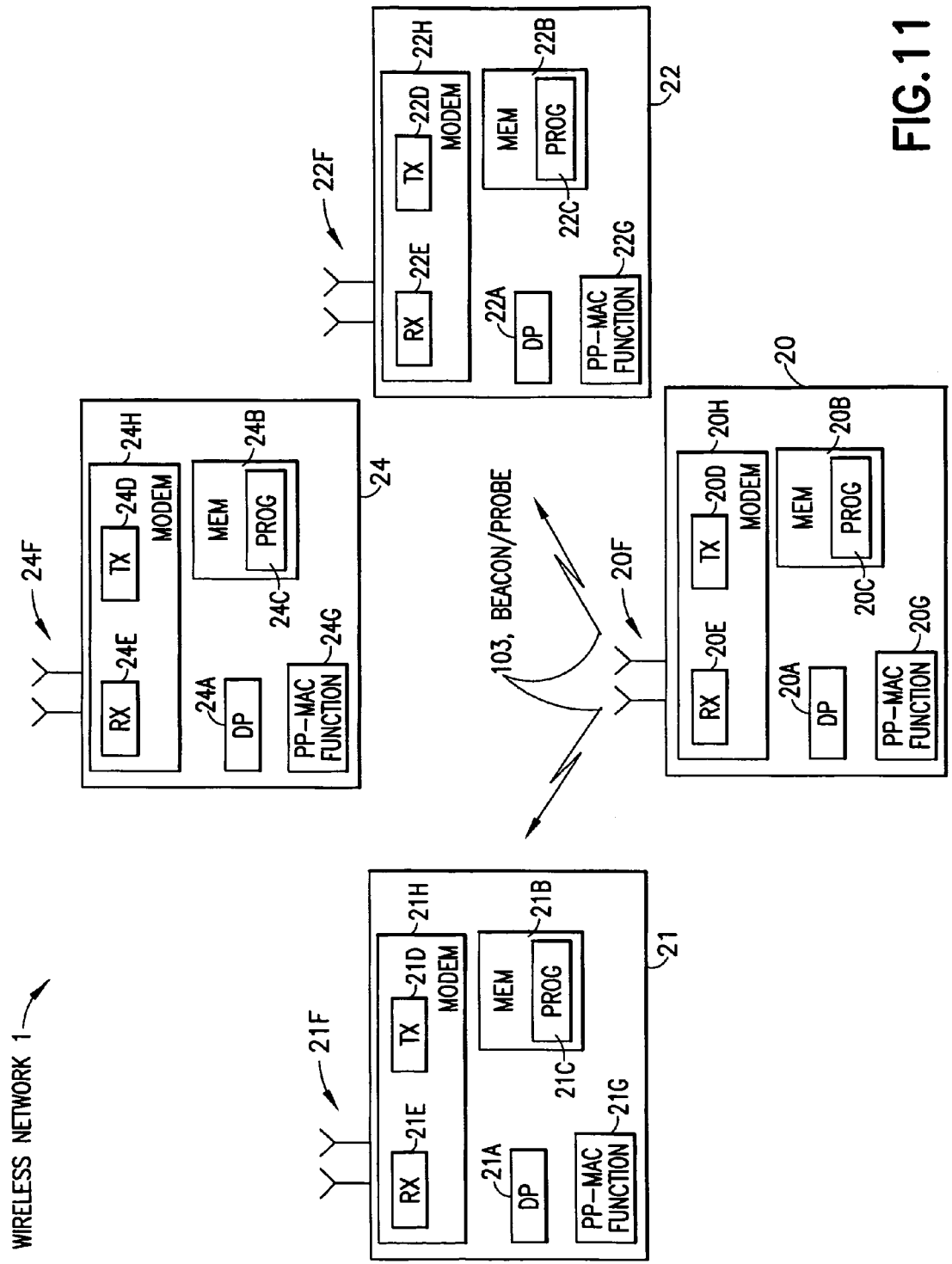
FIG. 11 is a simplified block diagram of various devices which are exemplary electronic devices suitable for use in practicing the exemplary embodiments of the invention.

A reference is now made to FIG. 11 for illustrating a simplified block diagram of various electronic devices and apparatus that are suitable for use in practicing the exemplary embodiments of this invention. In FIG. 11 a network node 20 is adapted for communication over a wireless link (not specifically shown) with mobile apparatuses, such as mobile terminals, UEs or user devices 21, 22 and 24. The network node 20 can be a WLAN access point or any WiFi device enabled to operate in accordance with the exemplary embodiments of the invention as described above. The UEs or user devices 21, 22 and 24 can be any device in the wireless network 1 enabled to operate in accordance with the exemplary embodiments of the invention as described above. The network node 20 may be embodied in a network node of a communication network, such as embodied in a base station of a cellular network or another device of the cellular network. In one particular implementation, any of the user devices 21, 22 and 24 may be embodied as a WLAN station STA, either an access point station or a non-access point station, or may be incorporated in a cellular communication device.

The network node 20 includes processing means such as at least one data processor (DP) 20A, storing means such as at least one computer-readable memory (MEM) 20B storing at least one computer program (PROG) 20C, and may also comprise communicating means such as a transmitter TX 20D and a receiver RX 20E for bidirectional wireless communications with the user device 24 via one or more antennas 20F. The RX 20E and the TX 20D are each shown as being embodied with a modem 20H in a radio-frequency front end chip, which is one non-limiting embodiment; the modem 20H may be a physically separate but electrically coupled component. Further, the network node 20 incorporates a PP-MAC function 20G which is coupled to at least the DP 20A, the MEM 20B and the PROG 20C of the network node 20. The PP-MAC function 20G to be used with at least the MEM 20B and DP 20A to perform the operations at least associated with FIGS. 3 and 4, as described above. These operations performed with the PP-MAC function 20G include the operations related to determining the variables "N" and "K" as well as transmitting the beacon frame/PROBE message 103, in accordance with the exemplary embodiments of the invention as at least described above The user device 21 similarly includes processing means such as at least one data processor (DP) 21A, storing means such as at least one computer-readable memory (MEM) 21B storing at least one computer program (PROG) 21C, and may also comprise communicating means such as a transmitter TX 21D and a receiver RX 21E and a modem 21H for bidirectional wireless communications with other apparatus of FIG. 11 via one or more antennas 21F. Using the PP-MAC function 21G, the user device 21 is at least enabled to perform the operations including at least processing the beacon frame/PROBE message 103 from the network node 20 in accordance with the exemplary embodiments of the invention, as described above.

Similarly, the user device 22 includes processing means such as at least one data processor (DP) 22A, storing means such as at least one computer-readable memory (MEM) 22B storing at least one computer program (PROG) 22C, and may also comprise communicating means such as a modem 22H for bidirectional communication with the other devices. Similar to the user device 21 the user device 22 is at least enabled, using the PP-MAC function 22G, to perform the operations including at least processing the beacon frame/PROBE message 103 from the network node 20, in accordance with the exemplary embodiments of the invention.

The user device 24 includes its own processing means such as at least one data processor (DP) 24A, storing means such as at least one computer-readable memory (MEM) 24B storing at least one computer program (PROG) 24C, and may also comprise communicating means such as a transmitter TX 24D and a receiver RX 24E and a modem 24H for bidirectional wireless communications with devices 20, 21, 22 and 24 as detailed above via its antennas 24F. Thus, similar to the user devices 21 and 22 the user device 24 is at least enabled, using the PP-MAC function 24G, to perform the operations including at least processing the beacon frame/PROBE message 103 from the network node 20, in accordance with the exemplary embodiments of the invention. In addition, while the network node 20 and user devices 21, 22 and 24 are discussed with respect to the network node 20 acting as a centralized node, the disclosure included herein may also apply to mesh networks, in which any node may probe and pull data from other nodes, as can the network node 20.

At least one of the PROGs 20C, 21C, 22C and 24C in the respective network device 20, 21, 22 and 24 is assumed to include program instructions that, when executed by the associated DP 20A, 21A, 22A and 24A enable the respective device to operate in accordance with the exemplary embodiments of this invention, as detailed above. Blocks 20G, 21G, 22G and 24G summarize different results from executing different tangibly stored software to implement certain aspects of these teachings. It is noted that devices identified by blocks 20G, 21G, 22G and 24G are configured to perform operations related to determining using the variables including "N" and "K," as well as transmitting the beacon frame/PROBE message 103, as in accordance with the exemplary embodiments of the invention. In these regards the exemplary embodiments of this invention may be implemented at least in part by computer software stored on the MEM 20B, 21B, 22B and 24B which is executable by the DP 20A, 21A, 22A and 24A of the respective other devices 20, 21, 22 and 24 or by hardware, or by a combination of tangibly stored software and hardware (and tangibly stored firmware). Electronic devices implementing these aspects of the invention need not be the entire devices as depicted at FIG. 11, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 21B, 22B and 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 21A, 22A and 24A include but are not limited to general purpose computers, special purpose computers, microprocessors, digital signal processors (DSPs) and multi-core processors.

Figure 12:
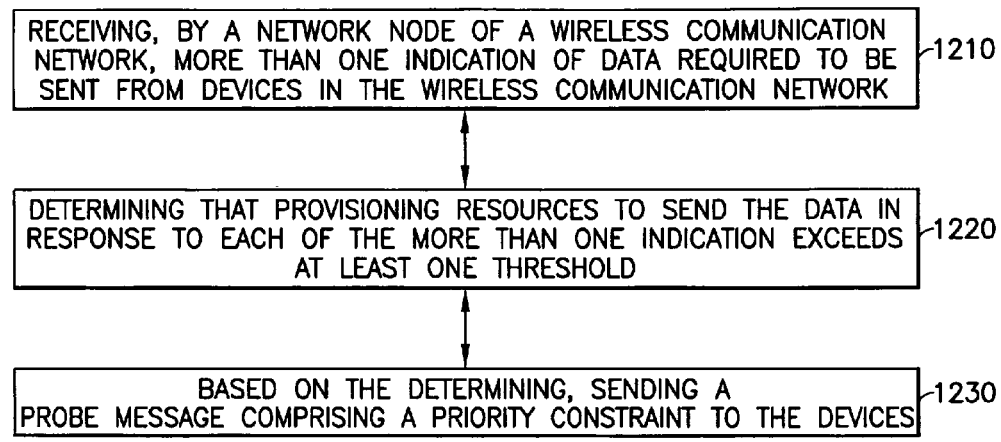
FIGS. 12 and 13 are logic flow diagrams that each illustrates the operation of a method, and a result of execution of computer program instructions embodied on a computer readable memory, in accordance with the exemplary embodiments of this invention.
Figure 13:
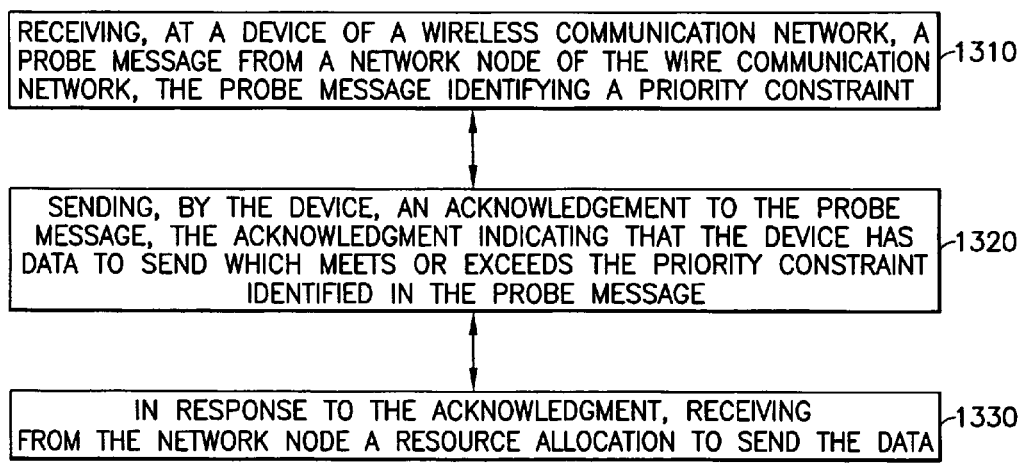

FIGS. 12 and 13 include block diagrams illustrating a method which may be implemented by an apparatus in accordance with the exemplary embodiments of the invention.

In regards to FIG. 12, at block 1210 there is a step of receiving, by a network node of a wireless communication network, more than one indication of data required to be sent from devices in the wireless communication network. At block 1220, there is a step of determining that provisioning resources to send the data in response to each of the more than one indication exceeds at least one threshold. Then at block 1230 there is a step, based on the determining, of sending a probe message comprising a priority constraint to the devices.

In accordance with the exemplary embodiments of the invention as described in the paragraph above, the steps further comprising receiving an acknowledgement to the probe message from one or more of the devices with data to send, the data to send having a priority which at least one of meets or exceeds the priority constraint identified in the probe message, and allocating a resource to the one or more devices in order to send the data.

In accordance with the exemplary embodiments of the invention as described in the paragraphs above, the priority constraint identified in the probe message is associated with a classification comprising at least one of regular reporting, low activity, medium activity, strong activity and malfunction detected.

In accordance with the exemplary embodiments as described in the paragraphs above, the more than one indication is received in response to a probe message previously sent to devices in the wireless communication network.

In accordance with the exemplary embodiments as described in the paragraphs above, the priority constraint identified in the probe message comprises at least one of significance level, priority of traffic, and delay tolerance.

Further, in accordance with the exemplary embodiments as described in the paragraphs above, the priority constraint identified in the probe message is application specific, and wherein the application comprises at least one of infrastructure monitoring, traffic monitoring, environmental monitoring, and hospital/health care equipment/environment monitoring.

In accordance with the exemplary embodiments as described in the paragraphs above, determining comprises determining that the more than one received indications exceed a number of resource allocations which can be performed during a period of time.

In addition, in accordance with an exemplary embodiment of the invention there is an apparatus comprising at least one processor, and at least one memory including computer program code, where the at least one memory and the computer program code are configured, with the at least one processor, to cause the apparatus to at least receive, with a network node of a wireless communication network, more than one indication of data required to be sent from devices in the wireless communication network, determine that provisioning resources to send the data in response to each of the more than one indication exceeds at least one threshold, and based on the determining, send a probe message comprising a priority constraint to the devices.

In accordance with the exemplary embodiments as described in the paragraph above, the second resource allocation comprises a resource allocation to a currently probed group and a resource allocation to a previously probed group to which the device belongs.

In accordance with the exemplary embodiments of the invention as described in the paragraph above, wherein the at least one memory including the computer program code is configured, with the at least one processor, to cause the apparatus to receive an acknowledgement to the probe message from one or more of the devices with data to send, the data to send having a priority which at least one of meets or exceeds the priority constraint identified in the probe message, and allocate a resource to the one or more devices in order to send the data.

In accordance with the exemplary embodiments as described in the paragraphs above, the priority constraint identified in the probe message is associated with a classification comprising at least one of regular reporting, low activity, medium activity, strong activity and malfunction detected.

In accordance with the exemplary embodiments of the invention as described in the paragraphs above, the more than one indication is received in response to a probe message previously sent to devices in the wireless communication network.

In accordance with the exemplary embodiments as described in the paragraphs above, the priority constraint identified in the probe message comprises at least one of significance level, priority of traffic, and delay tolerance.

In accordance with the exemplary embodiments as described in the paragraphs above, the priority constraint identified in the probe message is application specific, and wherein the application comprises at least one of infrastructure monitoring, traffic monitoring, environmental monitoring, and hospital/health care equipment/environment monitoring In accordance with the exemplary embodiments of the invention as described in the paragraphs above, determining comprises determining that the more than one received indications exceed a number of resource allocations which can be performed during a period of time.

Further, in accordance with an exemplary embodiment of the invention there is an apparatus comprising a means for receiving, at a network node of a wireless communication network, more than one indication of data required to be sent from devices in the wireless communication network, means for determining that provisioning resources to send the data in response to each of the more than one indication exceeds at least one threshold, and means, based on the determining, for sending a probe message comprising a priority constraint to the devices.

The apparatus in accordance with the exemplary embodiment of the invention as described in the paragraph above, wherein the means for determining and provisioning resources to send the data in response to each of the more than one indication exceeds at least one threshold, and means, based on the determining, for sending a probe message comprising a priority constraint to the devices.

In regards to FIG. 13, at block 1310 there is a step of receiving, at a device of a wireless communication network, a probe message from a network node of the wire communication network, the probe message identifying a priority constraint. At block 1320, there is a step sending, by the device, an acknowledgement to the probe message, the acknowledgment indicating that the device has data to send which meets or exceeds the priority constraint identified in the probe message. Then at block 1330 there is a step in response to the acknowledgment, of receiving from the network node a resource allocation to send the data.

In accordance with the exemplary embodiments as described in the paragraph above, the priority constraint identified in the probe message is associated with a classification comprising at least one of regular reporting, low activity, medium activity, strong activity and malfunction detected.

In accordance with the exemplary embodiments as described in the paragraphs above, the priority constraint identified in the probe message comprises at least one of significance level, priority of traffic, and delay tolerance.

In accordance with the exemplary embodiments as described in the paragraphs above, the priority constraint identified in the probe message is application specific, and wherein the application comprises at least one of infrastructure monitoring, traffic monitoring, environmental monitoring, and hospital/health care equipment/environment monitoring In addition, in accordance with an exemplary embodiment of the invention there is an apparatus comprising at least one processor, and at least one memory including computer program code, where the at least one memory and the computer program code are configured, with the at least one processor, to cause the apparatus to at least receive, at a device of a wireless communication network, a probe message from a network node of the wire communication network, the probe message identifying a priority constraint, send, by the device, an acknowledgement to the probe message, the acknowledgment indicating that the device has data to send which meets or exceeds the priority constraint identified in the probe message, and receive from the network node, in response to the acknowledgment, a resource allocation to send the data.

In accordance with the exemplary embodiments as described in the paragraph above, the priority constraint identified in the probe message is associated with a classification comprising at least one of regular reporting, low activity, medium activity, strong activity and malfunction detected.

In accordance with the exemplary embodiments as described in the paragraphs above, the priority constraint identified in the probe message comprises at least one of significance level, priority of traffic, and delay tolerance.

In accordance with the exemplary embodiments as described in the paragraphs above, the priority constraint identified in the probe message is application specific, and wherein the application comprises at least one of infrastructure monitoring, traffic monitoring, environmental monitoring, and hospital/health care equipment/environment monitoring.

Further, in accordance with an exemplary embodiment of the invention there is an apparatus comprising means for receiving, at a device of a wireless communication network, a probe message from a network node of the wire communication network, the probe message identifying a priority constraint, means for sending, by the device, an acknowledgement to the probe message, the acknowledgment indicating that the device has data to send which meets or exceeds the priority constraint identified in the probe message, and means, in response to the acknowledgment, for receiving from the network node a resource allocation to send the data.

In accordance with the exemplary embodiments as described in the paragraph above, the means for receiving comprises an interface to the wireless communication network, and the means for sending the acknowledgment comprises the interface and at least one computer readable memory including at least one computer program, the at least one computer program executable by at least one processor.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   receiving, by an access point of a wireless local area network, more than one indications of data required to be sent from devices in the wireless local area network;
   determining by the access point that the more than one received indications exceed a number of resource allocations which can be performed during a period of time; and
   based on the determining, sending, by the access point, a probe message comprising a priority constraint to the devices, wherein the priority constraint is for determining by the devices whether the devices may request a resource allocation.

2. The method according to claim 1, further comprising:
   receiving an acknowledgement to the probe message from one or more of the devices with data to send, the data to send having a priority which at least one of meets or exceeds the priority constraint identified in the probe message; and allocating a resource to the one or more of the devices in order to send the data.

3. The method according to claim 1, wherein the priority constraint identified in the probe message is associated with a classification comprising at least one of regular reporting, low activity, medium activity, strong activity and malfunction detected.

4. The method according to claim 1, wherein the more than one indications are received in response to a probe message previously sent to devices in the wireless local area network.

5. The method according to claim 1, wherein the priority constraint identified in the probe message comprises at least one of significance level, priority of traffic, and delay tolerance.

6. The method according to claim 1, wherein the priority constraint identified in the probe message is application specific, and wherein the application comprises at least one of infrastructure monitoring, traffic monitoring, environmental monitoring, and hospital/health care equipment/environment monitoring.

7. A non-transitory computer readable memory embodying at least one computer program code, the at least one computer program code executable by at least one processor to perform the method according to claim 1.

8. An apparatus comprising: at least one processor; and
at least one memory including computer program code, where the at least one memory and the computer program code are configured, with the at least one processor, to cause the apparatus to at least perform or control the following:
receiving, with an access point of a wireless local area network, more than one indications of data required to be sent from devices in the wireless local area network;
determining by the access point that the more than one received indications exceed a number of resource allocations which can be performed during a period of time; and
sending, by the access point, based on the determining, a probe message comprising a priority constraint to the devices, wherein the priority constraint is for determining by the devices whether the devices may request a resource allocation.

9. The apparatus according to claim 8, wherein the at least one memory including the computer program code is configured, with the at least one processor, to cause the apparatus to at least further perform or control the following:
receiving an acknowledgement to the probe message from one or more of the devices with data to send, the data to send having a priority which at least one of meets or exceeds the priority constraint identified in the probe message; and
allocating a resource to the one or more of the devices in order to send the data.

10. The apparatus according to claim 8, wherein the priority constraint identified in the probe message is associated with a classification comprising at least one of regular reporting, low activity, medium activity, strong activity and malfunction detected.

11. The apparatus according to claim 8, wherein the more than one indications are received in response to a probe message previously sent to devices in the wireless local area network.

12. The apparatus according to claim 8, wherein the priority constraint identified in the probe message comprises at least one of significance level, priority of traffic, and delay tolerance.

13. The apparatus according to claim 8, wherein the priority constraint identified in the probe message is application specific, and wherein the application comprises at least one of infrastructure monitoring, traffic monitoring, environmental monitoring, and hospital/health care equipment/environment monitoring.

14. A method comprising:
sending, by a device of a wireless local area network, an indication of data required to be sent, to an access point of the wireless local area network;
receiving, by the device, a probe message from the access point, the probe message identifying a priority constraint, wherein the priority constraint is for determining by the device whether the device may request a resource allocation;
sending, by the device, an acknowledgement to the probe message, the acknowledgment indicating that the device has data to send which meets or exceeds the priority constraint identified in the probe message; and
in response to the acknowledgment, receiving, by the device from the access point, a resource allocation to send the data.

15. The method according to claim 14, wherein the priority constraint identified in the probe message is associated with a classification comprising at least one of regular reporting, low activity, medium activity, strong activity and malfunction detected.

16. The method according to claim 14, wherein the priority constraint identified in the probe message comprises at least one of significance level, priority of traffic, and delay tolerance.

17. The method according to claim 14, wherein the priority constraint identified in the probe message is application specific, and wherein the application comprises at least one of infrastructure monitoring, traffic monitoring, environmental monitoring, and hospital/health care equipment/environment monitoring.

18. An apparatus comprising:
at least one processor; and
at least one memory including computer program code, where the at least one memory and the computer program code are configured, with the at least one processor, to cause the apparatus to at least perform or control the following:
sending, by a device of a wireless local area network, an indication of data required to be sent, to an access point of the wireless local area network;
receiving by the device, a probe message from the access point, the probe message identifying a priority constraint, wherein the priority constraint is for determining by the device whether the device may request a resource allocation;
sending, by the device, an acknowledgement to the probe message, the acknowledgment indicating that the device has data to send which meets or exceeds the priority constraint identified in the probe message; and
receiving, by the device from the access point, in response to the acknowledgment, a resource allocation to send the data.

19. The apparatus according to claim 18, wherein the priority constraint identified in the probe message is associated with a classification comprising at least one of regular reporting, low activity, medium activity, strong activity and malfunction detected.

20. The apparatus according to claim 18, wherein the priority constraint identified in the probe message comprises at least one of significance level, priority of traffic, and delay tolerance.

21. The apparatus according to claim 18, wherein the priority constraint identified in the probe message is application specific, and wherein the application comprises at least one of infrastructure monitoring, traffic monitoring, environmental monitoring, and hospital/health care equipment/environment monitoring.

* * * * *